(12) United States Patent
Takahashi et al.

(10) Patent No.: US 10,210,094 B2
(45) Date of Patent: Feb. 19, 2019

(54) INFORMATION PROCESSING SYSTEM, INFORMATION PROCESSING METHOD AND INFORMATION PROCESSING APPARATUS

(71) Applicant: FUJITSU LIMITED, Kawasaki-shi, Kanagawa (JP)

(72) Inventors: Jin Takahashi, Ota (JP); Seishi Okada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 15/221,633

(22) Filed: Jul. 28, 2016

(65) Prior Publication Data

US 2017/0039096 A1 Feb. 9, 2017

(30) Foreign Application Priority Data

Aug. 4, 2015 (JP) .................................. 2015-154137

(51) Int. Cl.
| | |
|---|---|
| G06F 11/00 | (2006.01) |
| G06F 12/0895 | (2016.01) |
| G06F 12/00 | (2006.01) |
| G06F 11/07 | (2006.01) |
| G06F 12/0817 | (2016.01) |

(52) U.S. Cl.
CPC ...... *G06F 12/0895* (2013.01); *G06F 11/0724* (2013.01); *G06F 11/0772* (2013.01); *G06F 12/00* (2013.01); *G06F 12/0817* (2013.01)

(58) Field of Classification Search
CPC ........ G06F 9/54; G06F 12/00; G06F 11/0772; G06F 11/0724

USPC .......................................................... 714/15
See application file for complete search history.

(56) References Cited

U.S. PATENT DOCUMENTS

| | | | | |
|---|---|---|---|---|
| 6,031,992 A | * | 2/2000 | Cmelik ................. | G06F 9/3017 712/1 |
| 6,272,662 B1 | * | 8/2001 | Jadav .................... | G06F 3/0607 714/770 |
| 6,415,364 B1 | * | 7/2002 | Bauman .............. | G06F 12/0817 710/20 |

(Continued)

FOREIGN PATENT DOCUMENTS

| | | |
|---|---|---|
| JP | 2013-130976 | 7/2013 |
| JP | 2013-140445 | 7/2013 |
| JP | 2014-197402 | 10/2014 |

*Primary Examiner* — Yair Leibovich
(74) *Attorney, Agent, or Firm* — Fujitsu Patent Center

(57) ABSTRACT

It is provided an information processing system. A first processing unit instructs a second processing unit to update the state management information regarding first data managed by the second processing unit when the first processing unit accesses the first data and detects an error regarding the first data, the second processing unit issues a command for discarding the first data acquired by a processing unit other than the second processing unit to the processing unit other than the second processing unit, when the processing unit which acquires the first data receives the command, the processing unit which acquires the first data discards the first data and transmits a result of the discarding of the first data to the second processing unit, and the second processing unit updates the state management information regarding the first data based on the result received from the processing unit which acquires the first data.

10 Claims, 18 Drawing Sheets

(56) References Cited

U.S. PATENT DOCUMENTS

| | | | |
|---|---|---|---|
| 2009/0198958 A1* | 8/2009 | Arimilli | H04L 45/06 |
| | | | 712/29 |
| 2011/0238885 A1* | 9/2011 | Kitahara | G06F 3/0613 |
| | | | 711/103 |
| 2013/0159638 A1 | 6/2013 | Koinuma et al. | |
| 2013/0170334 A1 | 7/2013 | Koinuma et al. | |
| 2014/0006852 A1* | 1/2014 | Buyuktosunoglu | |
| | | | G06F 15/7832 |
| | | | 714/10 |

* cited by examiner

FIG. 12A

ADDRESS SPECIFYING REGISTER 601

| FIELD | RESERVED | | PA | | RESERVED | |
|---|---|---|---|---|---|---|
| BIT | 63 | 47 | 46 | 7 | 6 | 0 |

FIG. 12B

COMMAND SPECIFYING REGISTER 602

| FIELD | RESERVED | | SIZE | | RESERVED | | COMMAND | |
|---|---|---|---|---|---|---|---|---|
| BIT | 63 | 11 | 10 | 8 | 7 | 4 | 3 | 0 |

COMMAND:
0000: NOP
0001: DIRECTORY NORMALIZATION
0010: CACHE DISCARDING
OTHERS : RESERVED

FIG. 12C

STATUS DISPLAYING REGISTER 603

| FIELD | RESERVED | | BUSY | RESERVED | | ERROR |
|---|---|---|---|---|---|---|
| BIT | 63 | 9 | 8 | 7 | 1 | 0 |

FIG. 14

| NO. | CONDITION | | | DIRECTORY CHECK OPERATION | |
|---|---|---|---|---|---|
| | COMMAND | ERROR MARK | ACQUIRED DATA | ISSUE COMMAND | RESPOND WITH RESULT |
| 1 | NORMALIZATION | NOT EXIST | * | | ○ |
| 2 | | EXIST | * | ○ | |
| 3 | INVESTIGATION | NOT EXIST | NOT EXIST | ○ | |
| 4 | | | EXIST | | ○ |
| 5 | | EXIST | * | | ○ (ERROR RESPONSE) |

* : DON'T CARE

FIG. 15

STATUS DISPLAYING REGISTER 603

| FIELD | RESERVED | BUSY | RESERVED | ERROR |
|---|---|---|---|---|
| BIT | 63          9 | 8 | 7          2 | 1   0 |

ERROR :
00 : COMPLETED NORMALLY
01 : DETECTED COHERENCY ERROR AND SET ERROR MARK IN DIRECTORY
10 : HOME CPU DETECTED ERROR AND DISCARDING CACHE FAILED
11 : NO RESPONSE FROM HOME CPU

INFORMATION PROCESSING SYSTEM, INFORMATION PROCESSING METHOD AND INFORMATION PROCESSING APPARATUS

CROSS-REFERENCE TO RELATED APPLICATION

This application is based upon and claims the benefit of priority of the prior Japanese Patent Application No. 2015-154137, filed on Aug. 4, 2015, the entire contents of which are incorporated herein by reference.

FIELD

The embodiments discussed herein pertain to an information processing system, an information processing method and an information processing apparatus.

BACKGROUND

Symmetric Multi-Processor (SMP) is a technique for allowing a plurality of processing units to share main memory. In a conventional information processing system with the SMP applied, a plurality of nodes each of which includes a processing unit and main memory are connected via a common bus and each processing unit shares each main memory with the other processing units.

Since the main memory which maybe hereinafter referred to as memory is shared and the coherency of data cached by the processing unit of each node is preserved the conventional information processing system, a so-called directory scheme can be employed in the conventional information processing system. The directory scheme is a scheme in which the memory in a node stores information indicating by which processing unit data in a processing unit in the node is cached to preserve the coherency of the cached data in the conventional information processing system. It is noted here that coherency means consistency of a resource shared by a plurality of caches.

Since memory is shared with a plurality of nodes in a conventional information processing system with SMP employed, a failure occurred in one node may induce a failure in another node. A shared memory system is known as means of reducing the impact of the failure occurred in one node. In the conventional shared memory system, memory is divided into shared memory and local memory and processing units of the other node in the system cannot reference the local memory. The shared memory system uses the shared memory as data communication means between the nodes in the system.

The following technique is known for performing a process when an error is detected or an error occurs in the conventional shared memory system. When a residence of packet communication occurs in a system in which a plurality of nodes are connected via internode connection apparatuses such as crossbar switches, the communication routes are changed to continue the processes. The crossbar switch is an apparatus for selecting the communication routes by controlling switches provided at the intersection points of the communication routes when data is transmitted and received between the plurality of nodes or between the memory in the nodes. A request output from a node is transmitted to its own node and the other nodes via a crossbar switch. The node which transmits the request measures the time between the transmission of the request and the receipt of the request. When the node detects the timeout of the measured time, the node regards the timeout as an error due to a residence of packet communication.

A conventional technique is known for setting an error mark in the directory to prevent the cache line on which the detected error occurs from being used. The cache line is a unit of cached data. When a CPU ceases its operation due to an error in a conventional shared memory system in which a plurality of CPUs employ the directory scheme to control cache memory, the error is detected by a timeout or an error mark in the directory. An error is also detected when the data coherency is not ensured due to a failure on a communication route in the system employing the directory scheme.

The following patent document describes conventional techniques related to the techniques described herein.

PATENT DOCUMENT

[Patent document 1] Japanese Laid-Open Patent Publication No. 2014-197402

SUMMARY

According to one embodiment, it is provided an information processing system in which a plurality of nodes including one or more processing units each of which manages memory connected with the processing unit are connected with each other. In addition, each processing unit executes instructing a measure regarding a detected error, updating state management information managed for each predetermined unit of data in the memory, issuing a command to a processing unit other than its own processing unit according to the state management information, and executing a command issued by a processing unit other than its own processing unit. Further, a first processing unit instructs a second processing unit to update the state management information regarding first data managed by the second processing unit when the first processing unit accesses the first data and detects an error regarding the first data, the second processing unit issues a command for discarding the first data acquired by a processing unit other than the second processing unit to the processing unit other than the second processing unit, when the processing unit which acquires the first data receives the command, the processing unit which acquires the first data discards the first data and transmits a result of the discarding of the first data to the second processing unit, and the second processing unit updates the state management information regarding the first data based on the result received from the processing unit which acquires the first data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 12A is a diagram illustrating an example of a register format of an address specifying register;

FIG. 12B is a diagram illustrating an example of a register format of a command specifying register;

FIG. 12C is a diagram illustrating an example of a register format of a status displaying register according to Embodiment 1;

FIG. 14 is a diagram illustrating an example of operation determination conditions of a directory controlling unit according to Embodiment 2;

FIG. 15 is a diagram illustrating an example of a register format of a status displaying register according to Embodiment 2;

DESCRIPTION OF EMBODIMENTS

Even when an error is detected based on an node trouble or a failure on a communication route, a coherency error cannot be corrected since cached data is not discarded and the directory regarding the data is not normalized. When the discard of the cached data and the normalization of the directory are not performed until the data which causes the error is accessed again. Therefore, when the conventional techniques are employed and the coherency cannot be maintained, the error of the cache coherency can be detected but the error cannot be corrected unless the system is rebooted. Embodiments are described below with reference to the drawings. Configurations of the following embodiments are exemplifications, and the present apparatus is not limited to the configurations of the embodiments.

First Embodiment

When an information processing system according to Embodiment 1 detect an error regarding data, the information processing system data discards the acquired data in the cache of the CPU which acquires the data to normalize the directory regarding the data. The directory information is information managed on a predetermined basis of data acquired from memory (hereinafter, referred to as cache line). In addition, the normalization of the directory is a process for setting a value indicating that the data in the cache line is normal when an error mark is set for the cache line.

(System Configuration)

Figure 1:
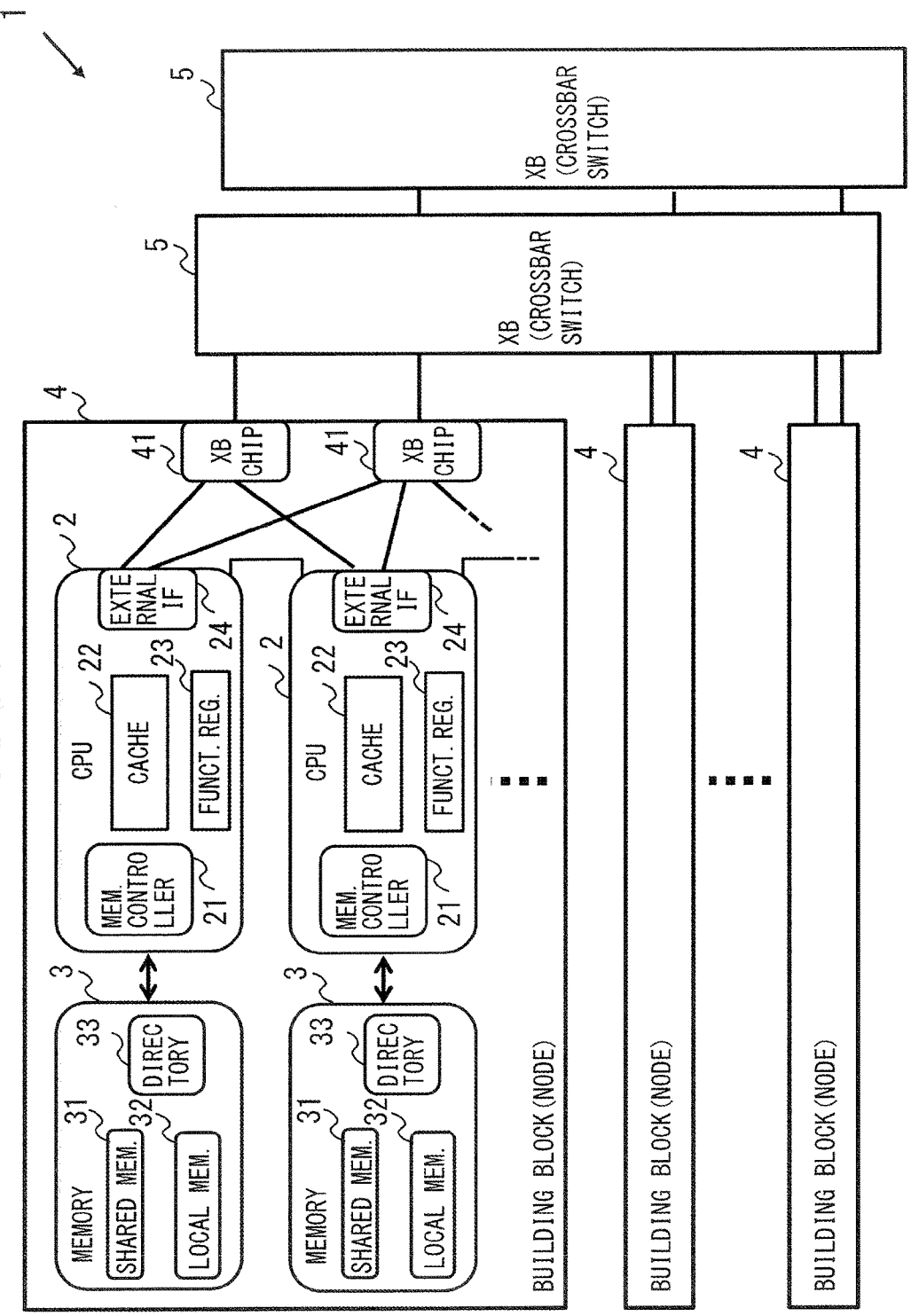
FIG. 1 is a diagram schematically illustrating an example of a configuration of an information processing system including shared memory.

FIG. 1 is a diagram illustrating an example of a configuration of an information processing system 1 including shared memory. A plurality of building blocks 4 (hereinafter, referred to as nodes 4) are connected with each other via crossbar switches (XB) 5. The information processing system 1 can be an information processing apparatus including the plurality of building blocks 4.

The node 4 includes one or more CPUs 2 and memory corresponding to each CPU 2. Each CPU 2 is connected with the crossbar switch 5 via a plurality of XB chips 41.

The CPU 2 includes a memory controller 21, a cache 22, a functional register 23 and an external interface (IF) 24. The memory controller 21 controls data passing with memory 33 and update of a directory 33 etc.

The cache 22 temporary hold data read from the memory for processes performed in the system. The functional register 23 stores addresses of data, commands from software and processing results according to the commands. The external IF 24 is an interface between the CPU 2 and external apparatuses.

The memory 3 includes shared memory 31, Local memory 32 and a directory 33. The shared memory 31 is a memory area which can be cross-referenced by other CPUs 2 in the same node 4 and CPUs 2 in another node 4.

The Local memory 32 is a memory area which can be cross-referenced by other CPUs 2 in the same node 4. The Local memory 32 is not referenced by the CPUs 2 in another node 4.

The directory 33 stores information including the state of data and the CPU 2 which acquires the data on a predetermined unit basis of acquired data. When data is accessed and an error is detected, an error mark is set to the corresponding directory 33. It is noted that the directory 33 is an example of "state management information".

It is noted that the configuration of the information processing system 1 and the information processing apparatus 1 is not limited to the configuration as described here. Element(s) can arbitrarily be omitted, replaced or added to the configurations as described here. For example, each node 4 can be connected directly instead of being connected via a crossbar switch 5. In addition, the information processing system 1 can include a plurality of CPUs 2 and each CPU can function as a node 4.

(Configuration)

Figure 2:
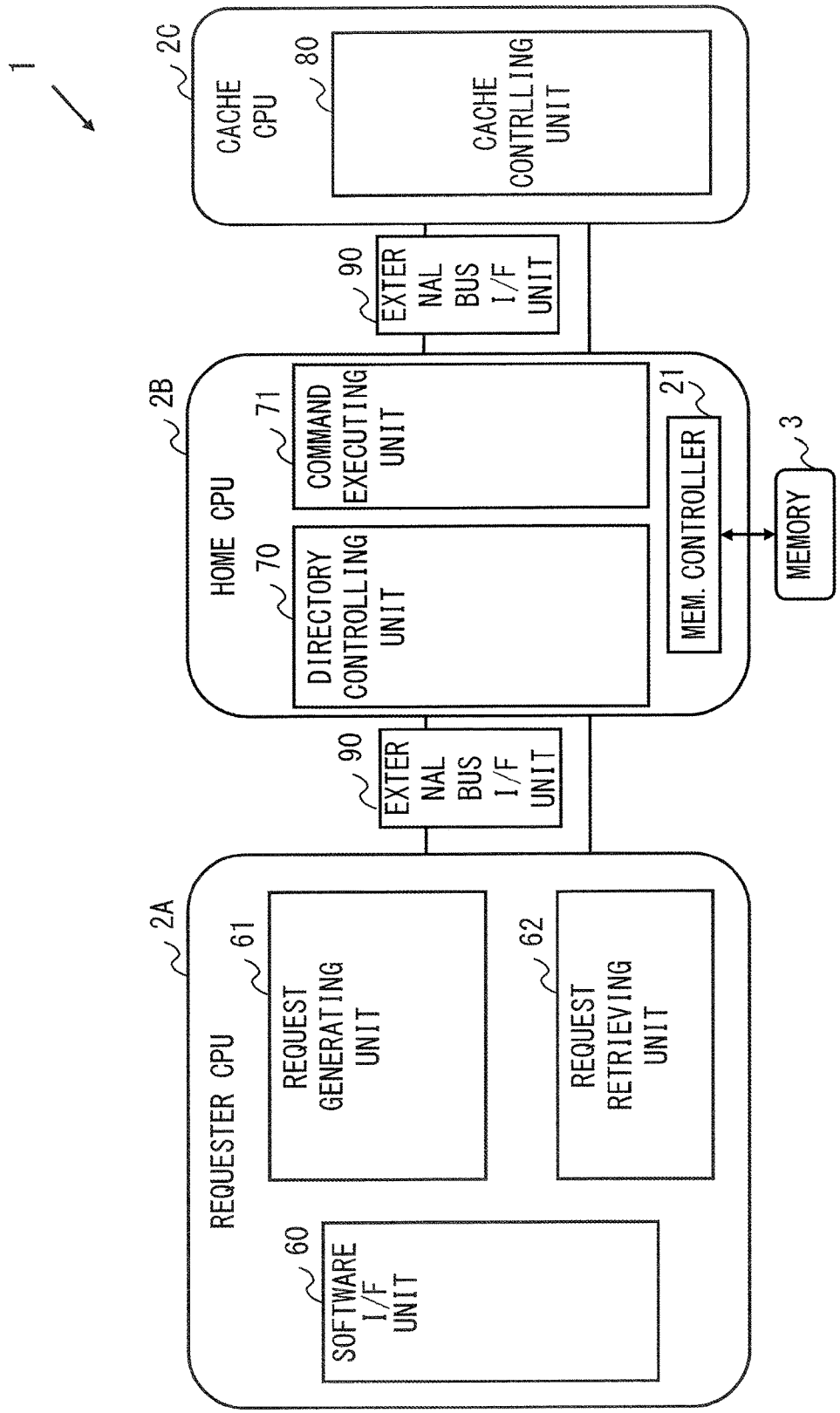
FIG. 2 is a diagram schematically illustrating an example of a functional configuration of the information processing system including the shared memory.

FIG. 2 illustrates an example of a configuration of the information processing system 1 including shared memory. The information processing system 1 includes a requester CPU 2A, a Home CPU 2B and a cache CPU 2C. The requester CPU 2A, the Home CPU 2B and the cache CPU 2C can be CPUs 2 included in different nodes 4 or the same node 4. In addition, the requester CPU 2A, the Home CPU 2B and the cache CPU 2C can be the same CPU 2.

When the requester CPU 2A, the Home CPU 2B and the cache CPU 2C can be CPUs 2 included in different nodes 4, the requester CPU 2A, the Home CPU 2B and the cache CPU 2C are connected with each other via an external bus interface (I/F) 90.

The requester CPU 2A includes a software interface (I/F) unit 60, a request generating unit 61 and a request retrieving unit 62. The requester CPU 2A is an example of a "first processing unit".

The software I/F unit 60 accepts commands from software. The software I/F unit 60 instructs the request generating unit 61 to generate requests based on the accepted commands. In addition, the software I/F unit 60 receives processing results for the commands from the request retrieving unit 62 and write states corresponding to the received processing results to the register which is referenced by the software.

The request generating unit 61 accepts instructions of generating requests according to data processed by the commands from the software I/F unit 60. The request generating unit 61 issues generated requests to the directory controlling unit 70 of the Home CPU 2B which manages the data processed by the commands.

The request retrieving unit 62 retrieves results according to the request generated by the request generating unit 61 from the directory controlling unit 70 of the Home CPU 2B and notify the retrieved results to the software I/F 60.

The Home CPU 2B includes the directory controlling unit 70, a command executing unit 71 and the memory controller 21. The Home CPU 2B is an example of a "second processing unit".

When the directory controlling unit 70 accepts a request issued by the request generating unit 61, the directory controlling unit 70 checks the directory 33. The directory controlling unit 70 determines whether to instruct the command executing unit 71 to issue a command for discarding the acquired data based on whether there is an error mark in the directory 33. In addition, the directory controlling unit 70 receives an execution result of the command from the command executing unit 71. The directory controlling unit 70 updates the directory 33 based on the received execution result. The directory controlling unit 70 notifies the request retrieving unit 62 of the received execution result.

The command executing unit 71 accepts an instruction of issuing a command from directory controlling unit 70. The command executing unit 71 issues a command for discarding the cached data and the like to each cache CPU 2C. In addition, the command executing unit 71 receives a response from each cache CPU 2C to which the command has been issued. The command executing unit 71 notifies the directory controlling unit 70 of the response result from each cache CPU 2C.

The memory controller 21 acquires the content of the directory 33 of the memory 3 and notifies the directory controlling unit 70 of the content of the directory 33. The memory controller 21 updates the directory 33 of the memory 3 according to the instruction received from the directory controlling unit 70.

The cache CPU 2C includes a cache controlling unit 80. The cache controlling unit accepts commands from the command executing unit 71 and discards acquired data. In addition, the cache CPU 2C notifies the command executing unit 71 of the execution results of the commands.

<Processes Performed when an Error is Detected>

FIGS. 3 to 8 are diagrams illustrating processes performed when an error is detected. It is noted in FIGS. 3 to 8 that since the node #0, the node #1 and the node #2 are examples of the node 4 as illustrated in FIG. 1 the detailed descriptions of the common configurations thereof. In addition, a part of the configurations of the node #0, the node #1 and the node #2 is omitted in FIGS. 3 to 8.

Each of the node #0, the node #1 and the node #2 includes a requester CPU 2A which is referred to as a requester node, a Home CPU 2B which is referred to as a Home node and a cache CPU 2C which is referred to as a acquisition node.

Since a CPU #00, a CPU #10 and a CPU #20 in FIGS. 3 to 8 are examples of the requester CPU 2A, the Home CPU 2B and the cache CPU 2C in FIG. 2, the detailed description of the common configurations thereof.

Figure 3:
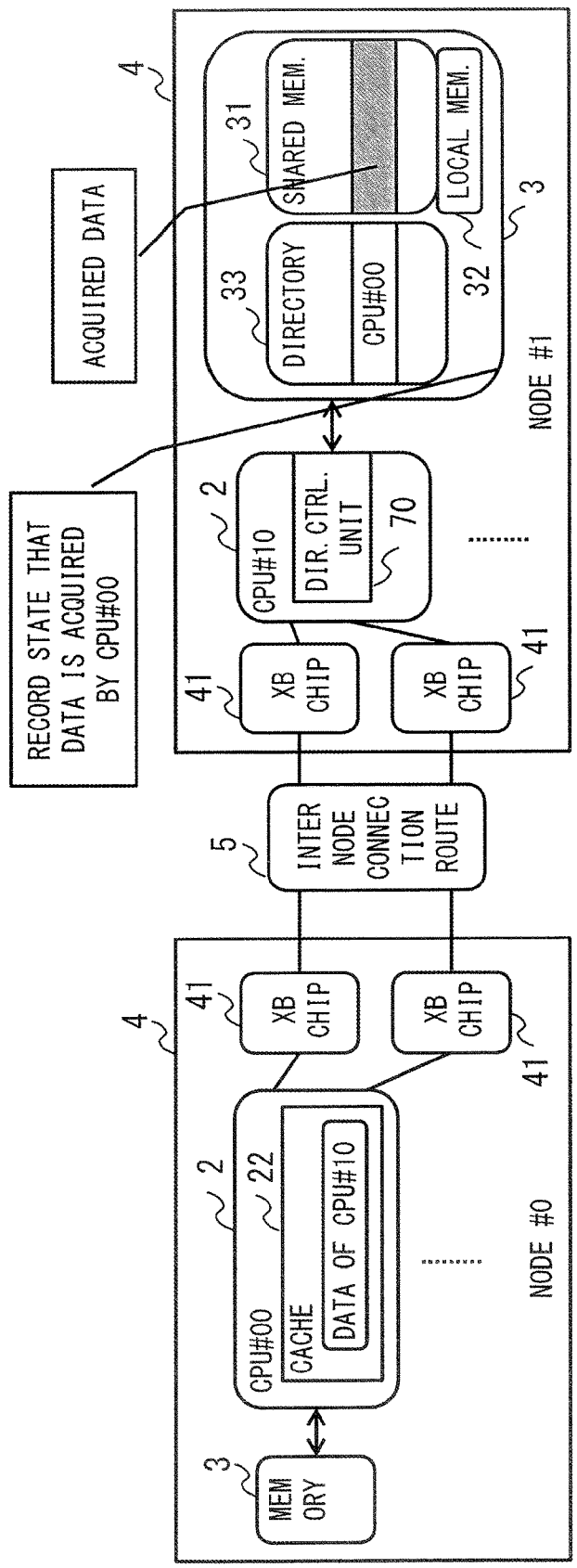
FIG. 3 is a diagram illustrating an example of a case in which data is acquired from a node.

FIG. 3 is a diagram illustrating an example of a case in which a node acquires data from another node. In FIG. 3, the node #0 and the node #1 are connection with each other via an internode connection route 5 such as a crossbar switch.

The CPU #00 in the node #0 acquires data in the shared memory 31 of the CPU #10 in the node #1. Therefore, the directory 33 on the memory 3 in the node #1 records a state that the data is acquired by the CPU #00.

Figure 4:
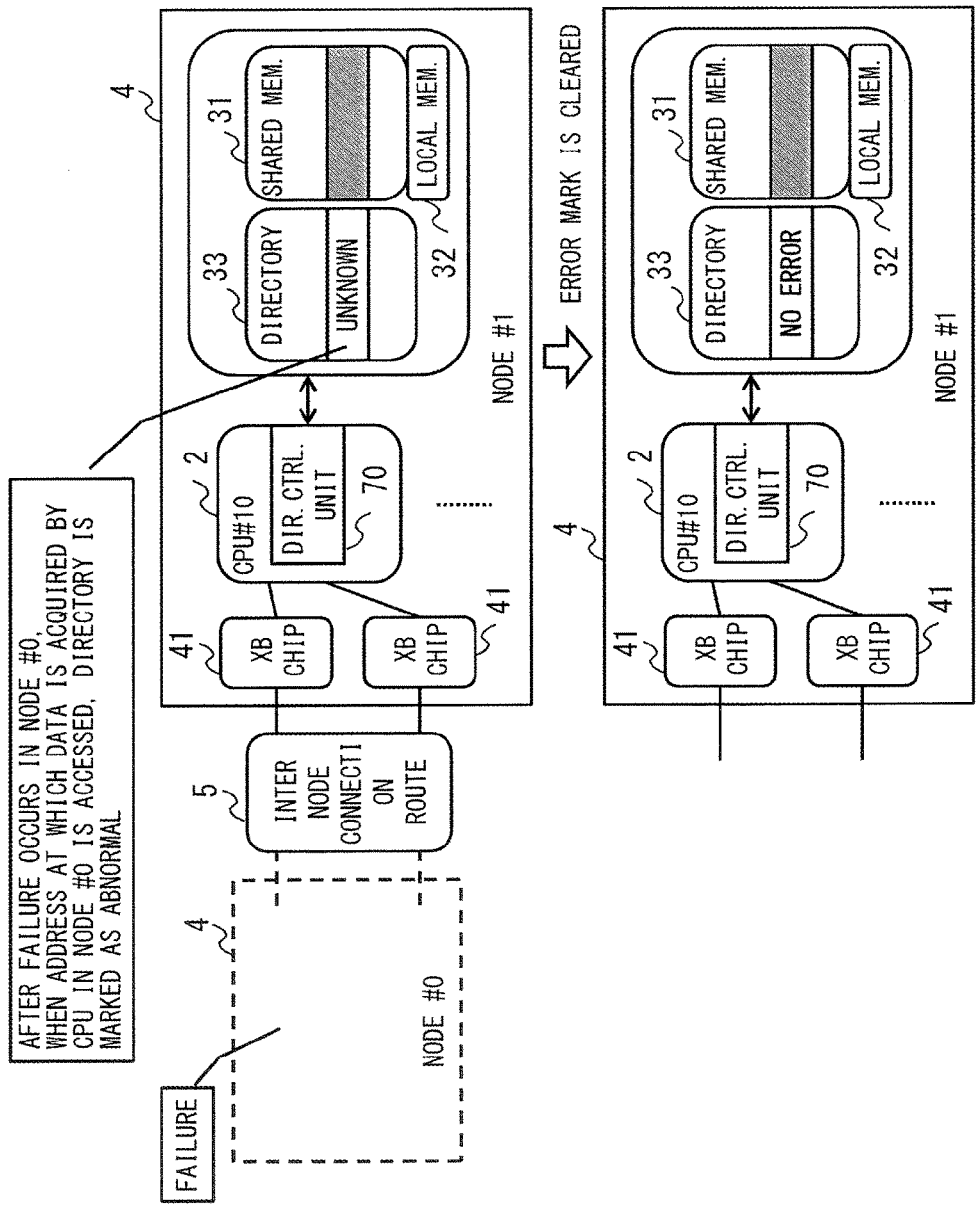
FIG. 4 is a diagram illustrating an example in a case in which a failure occurs in a node including a CPU by which data is acquired.

FIG. 4 is a diagram illustrating an example of a case in which a failure occurs in the node 4 including the CPU 2 by which data is acquired. When the failure occurs in the node #0 and the CPU 2 in another node 4 accesses the address of the cache line from which the data is acquired by the CPU #00 in the node #0, the directory controlling unit 70 tries to retrieve the acquired data from the node #0. However, since the directory controlling unit 70 is unable to retrieve the data due to the failure of the node #0, the directory controlling unit 70 sets an error mark ("Unknown" in FIG. 4) indicating that the state of the cache line is abnormal in the directory 33 in the node #1.

The directory controlling unit 70 is required to be instructed for normalizing the directory 33 in order to make the cache line for which the error mark is set available again. Therefore, the directory controlling unit 70 sets a mark ("No Error" in FIG. 4) indicating that the state of the cache line is normal in the directory 33.

Figure 5:
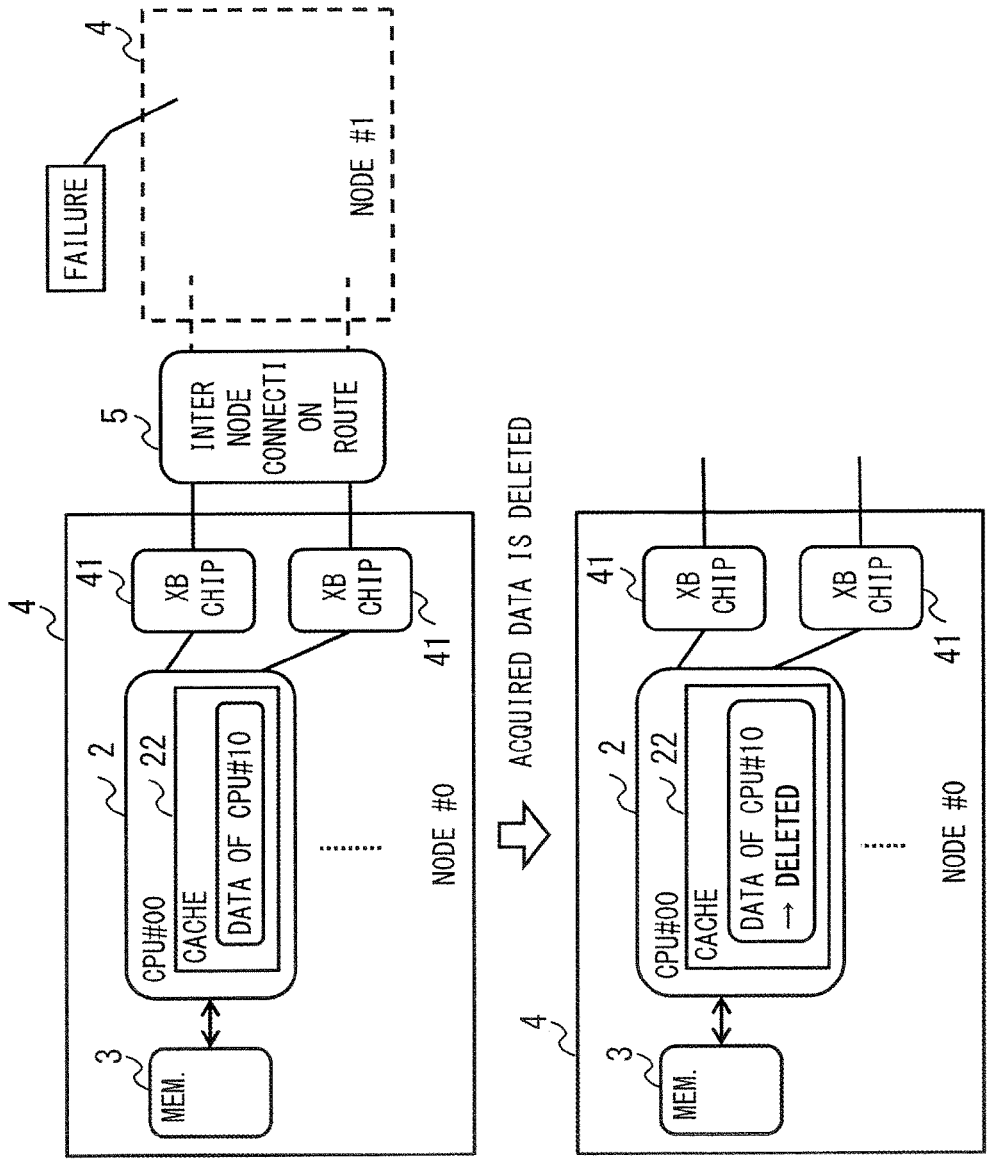
FIG. 5 is a diagram illustrating an example in a case in which a failure occurs in a node from which data is acquired.

FIG. 5 is a diagram illustrating an example of a case in which a failure occurs in the node 4 including the CPU 2 from which the data is acquired. When the failure occurs in the node #1, the CPU #00 is instructed to delete the data acquired from the CPU #10 in the node #1. Therefore, the CPU #00 deletes the data acquired from the CPU #10 in the cache 22.

Figure 6:
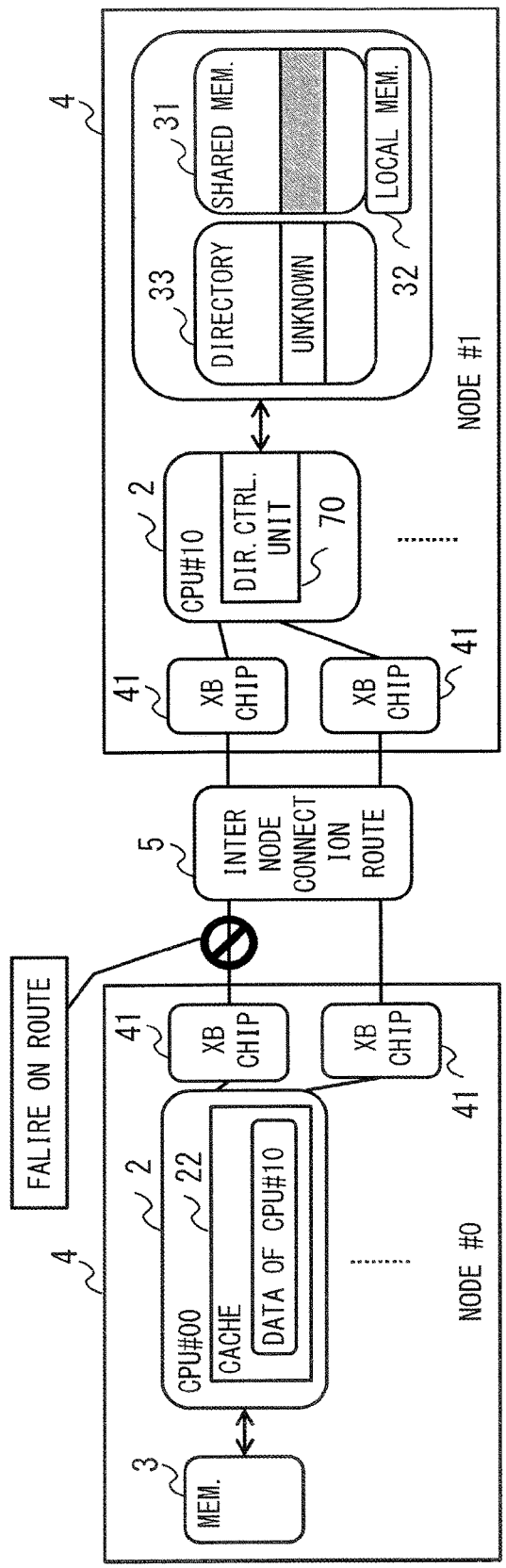
FIG. 6 is a diagram illustrating an example of a failure occurred on a route between nodes.

FIG. 6 is a diagram illustrating an example of a case in which a failure on communication route between nodes occurs. FIG. 6 illustrates that a failure occurs on one communication route between the node #0 and the node #1 after the CPU #00 acquires data from the CPU #10.

Similar to the example as illustrated in FIG. 4, when a CPU accesses the address of the cache line from which the data is acquired by the CPU #00, the directory controlling unit 70 sets an error mark indicating that the state of the cache line is abnormal to the directory 33.

The deletion of the data acquired from the CPU #10 in the cache 22 of the CPU #00 and the normalization of the directory 33 are required in order to make the cache line for which the error mark is set available again. Since the deletion of the data in the cache 22 and the normalization of the directory 33 are desirable to accompany in order to achieve the coherency. Specifically, the deletion of the data in the cache 22 and the normalization of the directory 33 can be performed while accesses to the cache line are prohibited by address lock.

Figure 7:
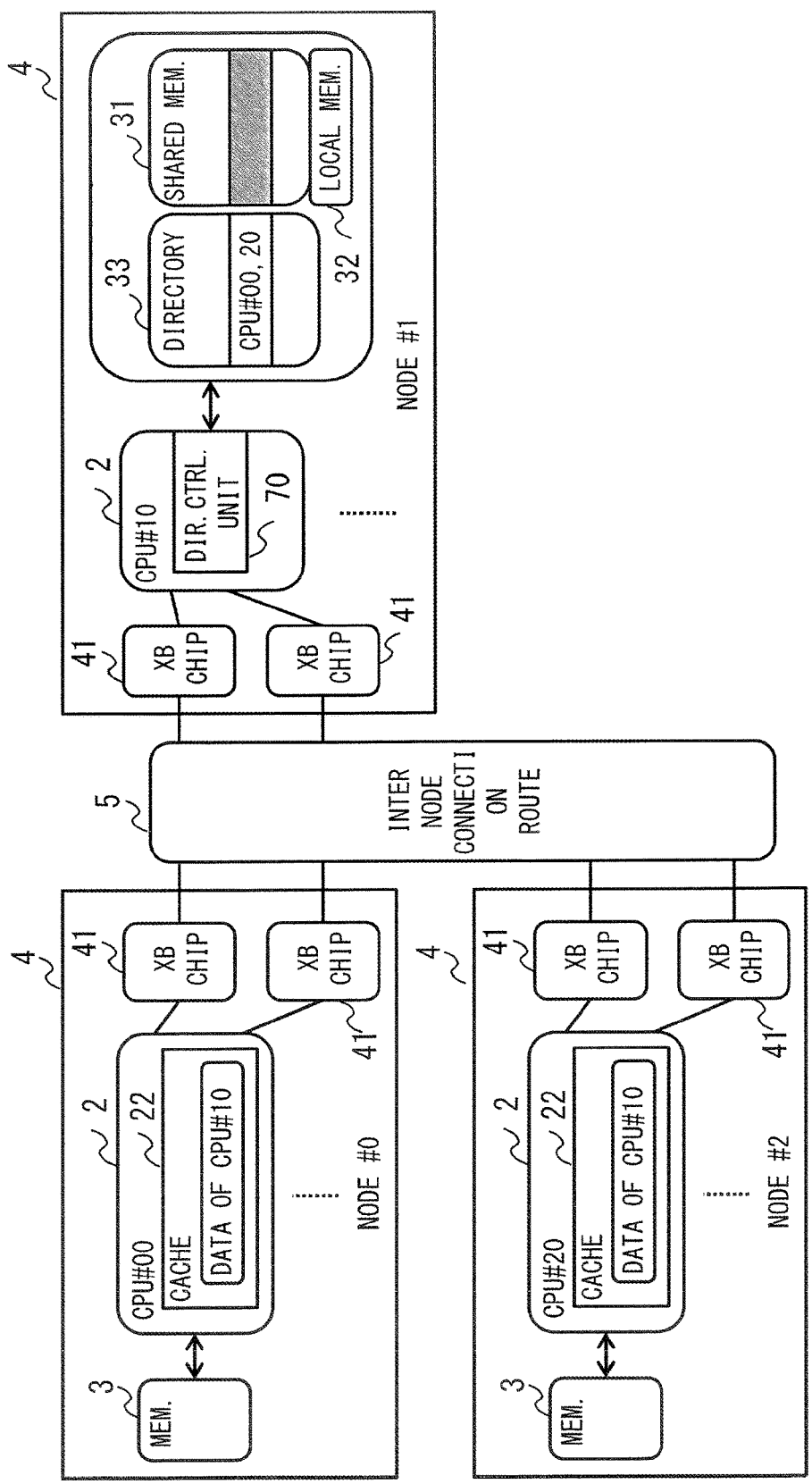
FIG. 7 is a diagram illustrating an example in a case in which data is acquired by a plurality of CPUs.

FIG. 7 is a diagram illustrating an example of a case in which data is acquired from a plurality of CPUs 2. In FIG. 7, the node #0, the node #1 and the node #2 are connected with each other via the internode connection route 5.

The CPU #00 in the node #0 and the CPU #20 in the node #2 acquire data in the shared memory 31 of the CPU #10 in the node #1. Therefore, the directory 33 on the memory 3 in the node #1 records a state that the data is acquired by the CPU #00 and the CPU #20.

Figure 8:
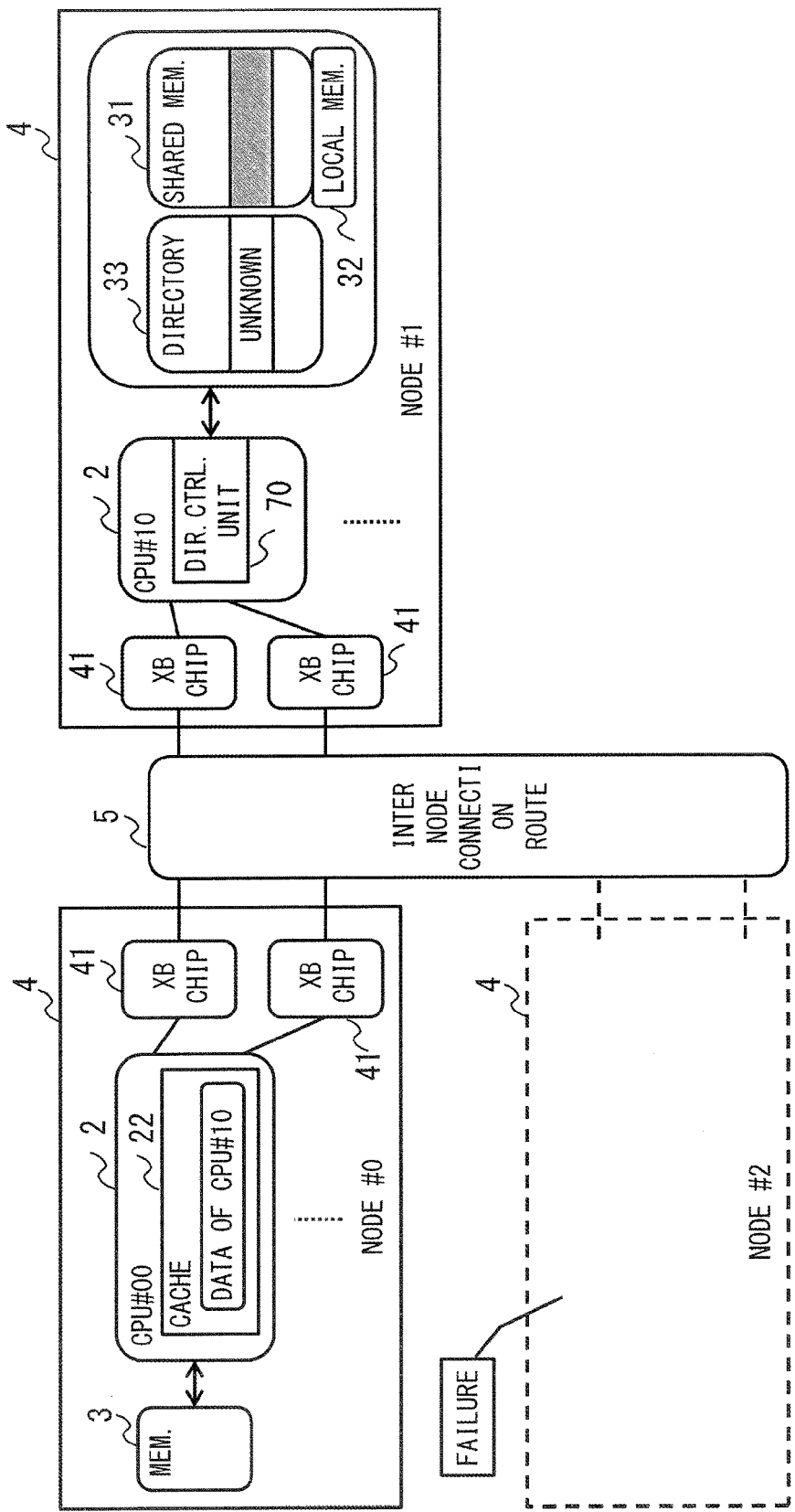
FIG. 8 is a diagram illustrating an example in a case in which data is acquired by a plurality of CPUs and a failure occurs in a node including one of the CPUs.

FIG. 8 is a diagram illustrating an example of a case in which data is acquired by a plurality of CPUs 2 and a failure occurs in one in the nodes 4 including CPUs 2 by which the data is acquired. When an error is detected, the directory controlling unit 70 sets an error mark indicating that the state of cache line is abnormal to the directory 33.

The deletion of the data acquired from the CPU #10 in the cache 22 of the CPU #00 and the normalization of the directory 33 are required in order to make the cache line for which the error mark is set available again. Since the deletion of the data in the cache 22 of the CPU #00 and the normalization of the directory 33 are desirable to accompany in order to achieve the coherency. Specifically, the deletion of the data in the cache 22 and the normalization of the directory 33 can be performed while accesses to the cache line are prohibited by address lock.

PROCESS EXAMPLES

Figure 9:
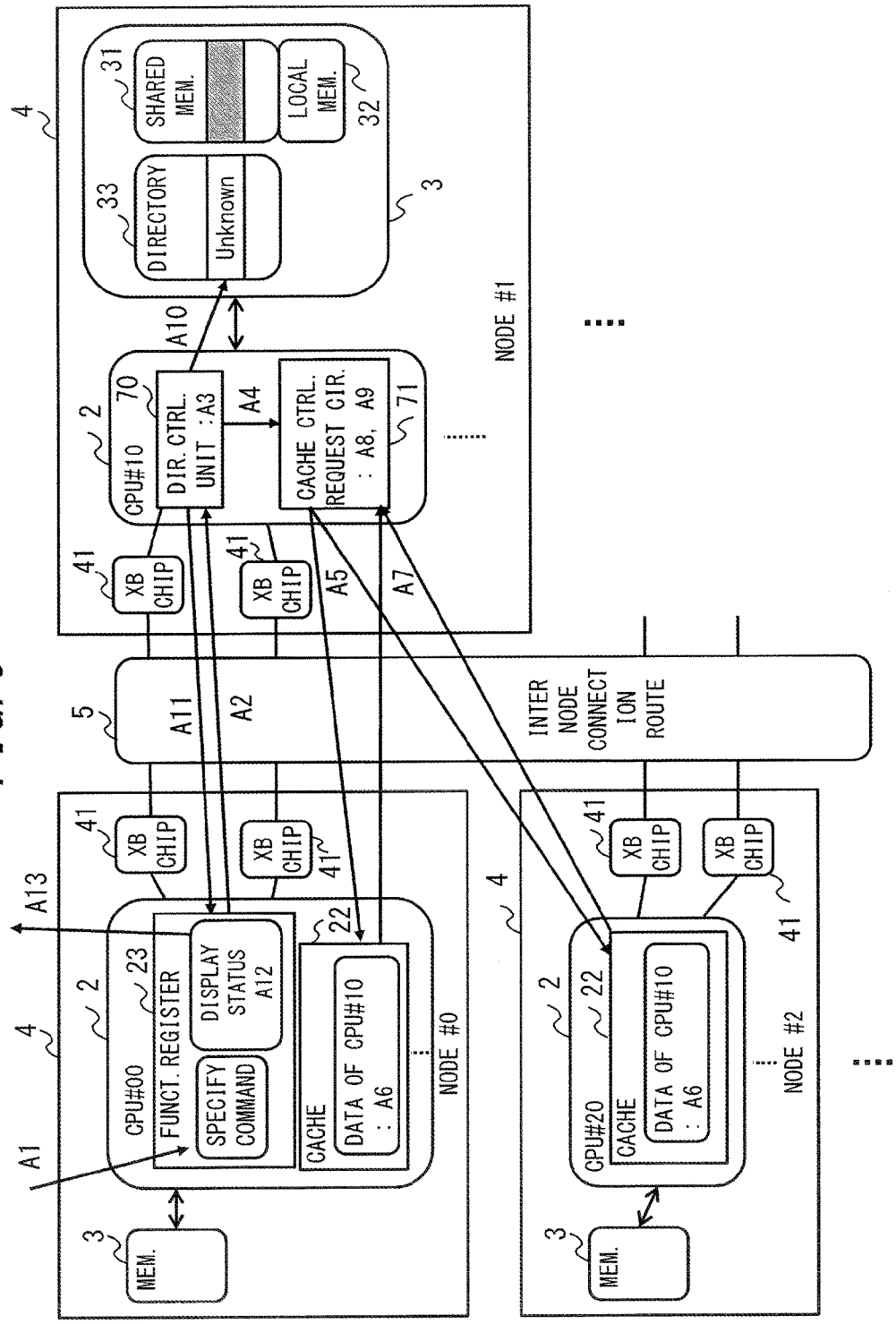
FIG. 9 is a diagram illustrating an example of processes for normalizing a directory.

FIG. 9 is a diagram illustrating an example of a process for normalizing the directory 33. The information processing system 1 includes the node #0, the node #1 and the node #2. The CPU #00 in the node #0 and the CPU #20 in the node #2 acquire the data in the shared memory 31 in the node #1. The example in FIG. 9 illustrates a process for normalizing the directory 33 when an error mark is set to the directory 33 due to some sort of failure.

When an error is detected, the software writes a value corresponding to a command for normalizing the directory to the command specifying register of the functional register in the node #0 which issue an instruction to the node #1 (Home node) (A1).

When the command is written to the functional register 23, the CPU #00 requests the directory controlling unit 70 of the CPU #10 in the node #1 for the normalization of the directory (A2). The directory controlling unit 70 locks the address of the data acquired by the CPU #00 and the CPU #20 in order to prevent the other CPUs from accessing the address (A3). The directory controlling unit 70 can use a so-called Cache Coherent NonUniform Memory Access (ccNUMA) scheme to lock the address.

The directory controlling unit 70 detects that an error mark is set to the directory 33. Since the error mark is set to the directory 33, it is unknown which CPU 2 acquires the data. Therefore, the directory controlling unit 70 instructs the cache control request circuit 71 to discard the data corresponding to the address from which the other CPUs 2 in the information processing system 1 acquire the data (AA). It is noted that the cache control request circuit 71 performs a part of the process as the command executing unit 71.

The cache control request circuit 71 instructs the other CPUs 2 in the information processing system 1 to discard the acquired data corresponding to the address (A5). The instructed CPUs 2 check whether the own CPUs 2 acquire the data and delete the data when the own CPUs 2 acquire the data (A6).

When the instructed CPU 2 deletes the acquired data without problem or does not acquire the data, the CPU 2 notifies the cache control request circuit 71 of the CPU #10 in the node #1 that the process is completed (A7). On the other hand, when a failure occurs in the instructed CPU 2, the CPU 2 notifies the cache control request circuit 71 of an error (A7).

The cache control request circuit 71 waits for a notification of the completion of the process or the error from each CPU 2 which the cache control request circuit 71 instructs to discard the acquired data in A5 (A8). When the cache control request circuit 71 receives the notification of the completion of the process from each CPU 2, the cache control request circuit 71 notifies the directory controlling unit 70 of the completion (A9). On the other hand, when the cache control request circuit 71 receives an error from one of the other CPUs 2 or a timeout occurs because the cache control request circuit 71 does not receive any notifications from the other CPUs 2, the cache control request circuit 71 notifies the directory controlling unit 70 of an error (A9).

When the directory controlling unit 70 receives the notification of the completion of the process, the directory controlling unit 70 normalizes the directory 33 (A10). On the other hand, when the directory controlling unit 70 receives the notification of the error, the directory controlling unit 70 maintains the error mark set to the directory 33 (A10).

The directory controlling unit 70 notifies the CPU #00 from which the directory controlling unit 70 receives the request for normalizing the directory of the result of the process for normalizing the directory (A11). And then the CPU #00 writes a value corresponding to the result of the process in the status display register of the functional register 23 (A12).

The software which writes the command for normalizing the directory in A1 monitors the status display register of the functional register 23 and determines whether the process for normalizing the directory is completed normally.

It is noted that FIG. 9 illustrates an example of processes performed when a failure occurs in the node 4 other than the node #0, the node #1 and the node #2 or when a failure occurs on the communication route. When a failure occurs in the node #1, the directory controlling unit 70 and the cache control request circuit 71 can perform the processes A3, AA, A5 and A11. It is noted that the CPU #00, the CPU #10 and the CPU #20 include the cache 22, the functional register 23, the directory controlling unit 70 and the cache control request circuit 71. Further, when a failure occurs in the node #1, the normalization of the directory 33 (A10) is not performed.

CIRCUIT EXAMPLE

Figure 10:
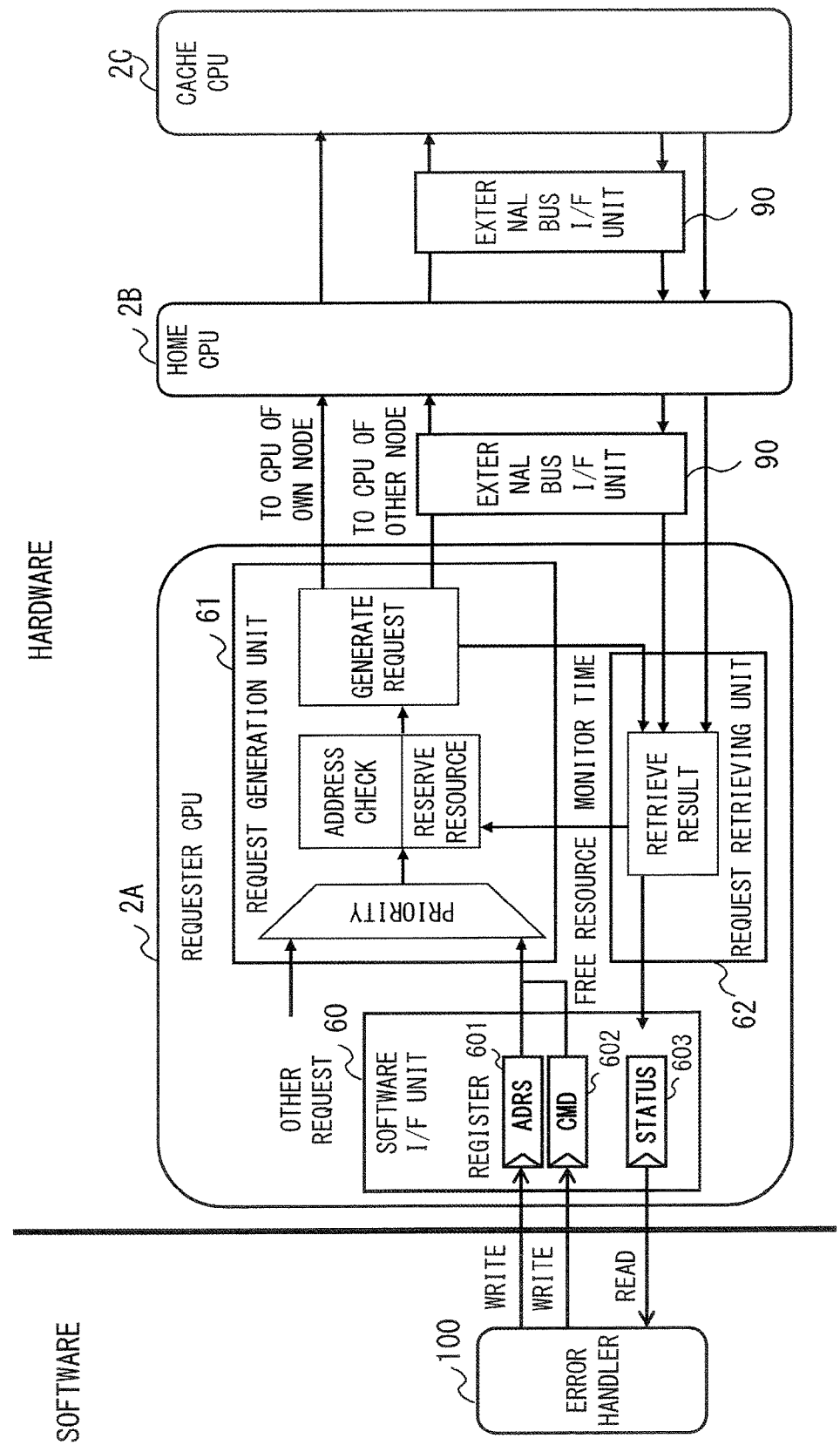
FIG. 10 is a diagram illustrating an example of a circuit of a requester CPU.
Figure 11:
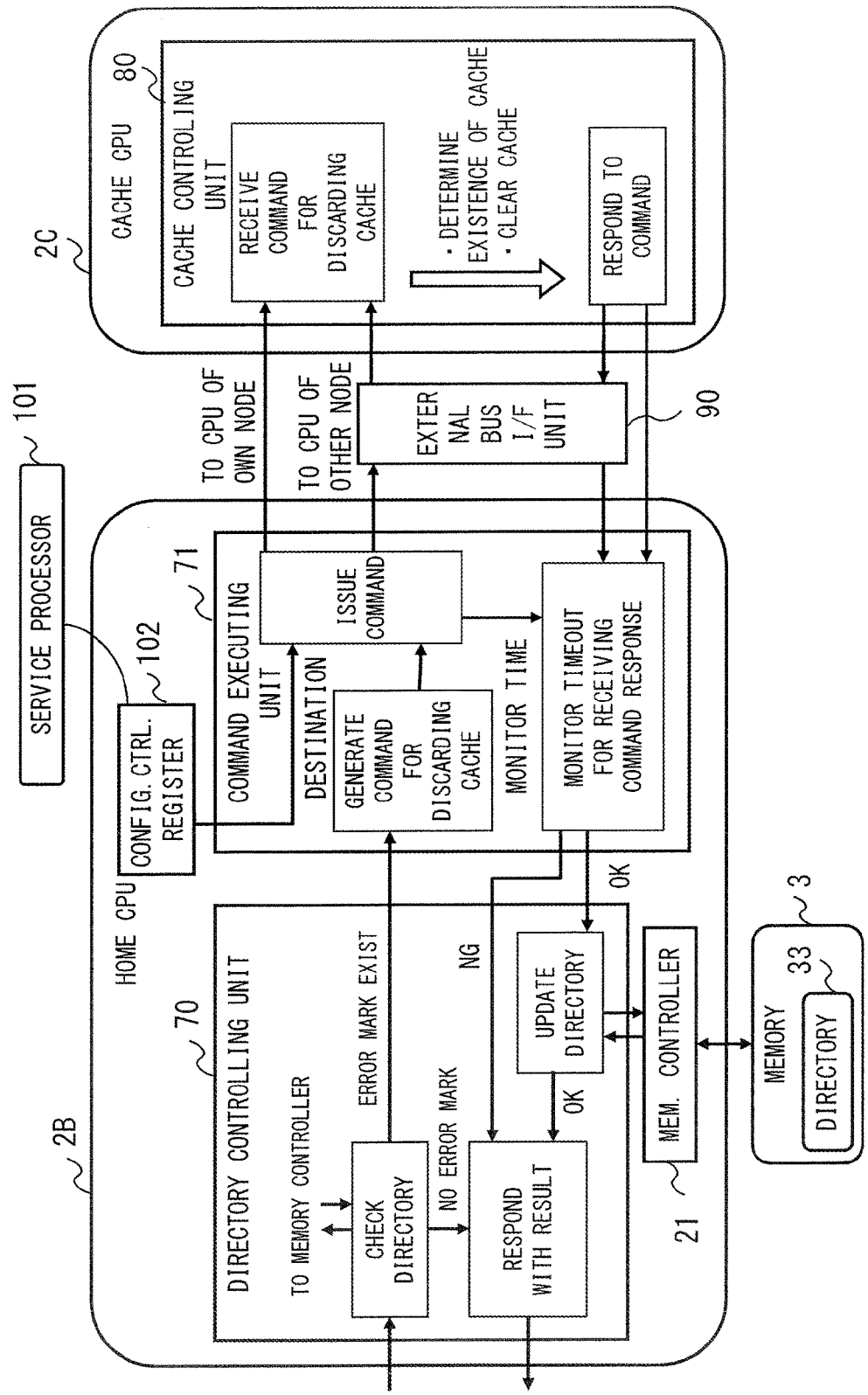
FIG. 11 is a diagram illustrating an example of a circuit of a Home CPU and a circuit of a cache CPU according to Embodiment 1.

FIGS. 10 to 12C are diagrams illustrating the circuits of the requester CPU 2A, the Home CPU 2B and the cache CPU 2C. FIGS. 10 and 11 illustrate examples of the circuits of the requester CPU 2A, the Home CPU 2B and the cache CPU 2C. FIGS. 12A to 12C illustrate examples of the formats of the functional register 23 of the requester CPU 2A.

FIG. 10 is a diagram illustrating an example of the circuit of the requester CPU 2A. The requester CPU 2A accepts commands from the software. The requester CPU 2A uses the software I/F unit 60, the request generating unit 61 and the request retrieving unit 62 to instruct the Home CPU 2B to normalize the directory and to retrieve the result of the process.

The software I/F unit 60 includes an address specifying register (ADRS) 601, a command specifying register (CMD) 602 and a status displaying register (STATUS) 603.

When the software detects an error, the error handler 100 writes an address of the cache line corresponding to the command in the address specifying register 601. In addition, the error handler 100 writes a value specifying the command in the command specifying register 602.

When the address is written to the address specifying register and the value is written to the command specifying register 602, the software I/F unit 60 starts the process for normalizing the directory and instructs the request generating unit 61 to issue a request.

The software I/F unit 60 receives the result of the execution of the command from the request retrieving unit 62. The software I/F unit 60 updates the value of the status displaying register 603 according to the received result. After the error handler 100 writes the address to the address specifying register 601 and the value to the command specifying register 602, the error handler monitors the update of the value of the status displaying register 603.

The request generating unit 61 performs processes instructions received from the software I/F unit 60 and other requests according to their priorities. The request generating unit 61 checks the address specified by the address specifying register 601 to reserve a resource for the execution of the command. The request generating unit 61 generates a request and issues the generated request to the Home CPU 2B which manages the specified address.

When the Home CPU 2B which manages the specified address is a CPU 2 in a node 4 which differs from the requester node including the requester CPU 2A, the request generating unit 61 issues the request to the directory controlling unit 70 of the Home CPU 2B via the external bus I/F unit 90. When the Home CPU 2B is a CPU 2 in the requester node, the request generating unit 61 issues the request to the directory controlling unit 70 of the Home CPU 2B without the external bus I/F unit 90.

The request retrieving unit 62 retrieves the result of the execution of the command from the Home CPU 2B. When the Home CPU 2B is a CPU 2 in a node 4 which differs from the requester node including the requester CPU 2A, the request retrieving unit 62 retrieves the result via the external bus I/F unit 90. When the Home CPU 2B is a CPU 2 in the requester node, the request retrieving unit 62 retrieves the result without the external bus I/F unit 90.

The request retrieving unit 62 instructs the request generating unit 61 to free the resource. The request retrieving unit 62 notifies the software I/F unit 60 of the retrieved result. The request retrieving unit 62 monitors the time and notifies the software I/F unit 60 of a failure when the request retrieving unit 62 does not receive a response from the Home CPU 2B for a predetermined time.

FIG. 11 is a diagram illustrating an example of the circuits of the Home CPU 2B and the cache CPU 2C according to Embodiment 1. The Home CPU 2B accepts requests from the requester CPU 2A. The Home CPU 2B uses the directory controlling unit 70, the command executing unit 71 and the memory controller 21 to instruct the cache CPU 2C to discard the cached data and retrieve the result. The cache CPU 2C uses the cache controlling unit 80 to discard the cached data and notifies the result of the Home CPU 2B.

When the directory controlling unit 70 of the Home CPU 2B accepts a request from the requester CPU 2A, the directory controlling unit 70 checks via the memory controller 21 whether an error mark is set to the directory 33. When an error mark is not set to the directory 33, the directory controlling unit 70 transmits a response of a normal result to the requester CPU 2A. When an error mark is set to the directory 33, the directory controlling unit 70 instructs the command executing unit 71 to generate a command for discarding the cached data. It is noted that the command for discarding the cached data is hereinafter referred to as cache discarding command.

The command executing unit 71 of the Home CPU 2B issues a cache discarding command to the cache CPU 2C. The cache CPU 2C corresponds to each CPU 2 in the information processing system 1. When the command executing unit 71 determines the CPU 2 which acquires the data, the command executing unit 71 recognizes the determined CPU 2 as a cache CPU 2 and issues a cache discarding command to the cache CPU 2.

The command executing unit 71 references the configuration controlling register 102 which is provided for the service processor 101 when the information processing system 1 powered on. The service processor 101 is a processor for managing the controls including the power-on control, the clock control, the FAN control, the processor start-up sequence control in the information processing system 1. The configuration controlling register 102 is used for changing the system settings according to the system configuration. For example, it can be assumed that the number of nodes 4 is not fixed and ranges from 1 to 16. In this case, the destination specifying register of the configuration controlling register set the node 4 which exists in the system to Enable.

When the cache CPU 2C is a CPU 2 in a node 4 which differs from the Home node including the Home CPU 2B, the command executing unit 71 issues a cache discarding command to the cache controlling unit 80 of the cache CPU 2C via the external bus I/F unit 90. When the cache CPU 2C is a CPU 2 in the Home node, the command executing unit 71 issues a cache discarding command to the cache controlling unit 80 of the cache CPU 2C without the external bus I/F unit 90.

The cache controlling unit 80 of the cache CPU 2C receives a cache discarding command, the cache controlling unit 80 determines whether the data corresponding to the address is cached. When the data corresponding to the address is cached, the cache controlling unit 80 discards the cached data and transmits a response indicating that the cached data is discarded to the command executing unit 71. When the cache controlling unit 80 detects an error in the determination, the cache controlling unit 80 transmits a response indicating that the error occurs to the command executing unit 71.

When the cache CPU 2C is a CPU 2 in a node 4 which differs from the Home node including the Home CPU 2B, the cache controlling unit 80 issues a response to the command executing unit 71 of the Home CPU 2B via the external bus I/F unit 90. When the cache CPU 2C is a CPU 2 in the Home node, the cache controlling unit 80 transmits a response to the command executing unit 71 of the Home CPU 2B without the external bus I/F unit 90.

The command executing unit 71 of the Home CPU 2B checks whether the command executing unit 71 receives the response from each cache CPU 2C to which the command is issued. When the command executing unit 71 receives the response from each cache CPU 2C, the command executing unit 71 notifies the directory controlling unit 70 of the completion of the receipt of the response. The command executing unit 71 monitors the time and notifies the directory controlling unit 70 of a failure when the command executing unit 71 does not receive a response from the cache CPU 2C for a predetermined time.

The directory controlling unit 70 of the Home CPU 2B receives the result of the execution of the command from the command executing unit 71. When the directory controlling unit 70 receives the notification of the completion of the execution of the command, the directory controlling unit 70 normalizes the directory 33 via the memory controller 21 to set the directory 33 to indicate that data is not acquired. When the directory controlling unit 70 receives the notification of the failure, the directory controlling unit 70 notifies the requester CPU 2A of the result with the error mark set to the directory 33.

When an error mark is set to the directory 33 in the example as illustrated in FIG. 11, the Home CPU 2B issues a command for discarding the cached data to the cache CPU 2C. However, the Home CPU 2B can be configured to transmit a response indicating an error to the requester CPU 2A and the command executing unit 71 of the requester CPU 2A can be configured to issue the command for discarding the cached data to the cache CPU 2C.

FIG. 11 illustrates an example of a case in which the Home CPU 2B instructs the normalization of the directory 33 and instructs the cache CPU 2C to discard the data. However, when a failure occurs in the Home CPU 2B and cached data is required to be discarded in the information processing system 1, the command executing unit 71 of the requester CPU 2A can be configured to issue a command for discarding the cached data to the cache CPU 2C.

FIG. 12A is a diagram illustrating an example of a register format in the address specifying register 601. Bits from 0 to 6 and 47 to 60 are reserved bits. Bits from 7 to 46 are bits for a PA field for specifying an address on the cache line as a target of the execution of a command.

FIG. 12B is a diagram illustrating an example of a register format in the command specifying register 602. Bits from 4 to 7 and 11 to 63 are reserved bits. Bits from 0 to 3 are bits for a Command field for specifying a command. For example, "0000" means a command of NO Operation (NOP), that is a command that does nothing. In addition, "0001" means a command for normalizing a directory. Further, "0010" means a command for discarding cached data issued in a case in which a failure occurs in the Home CPU 2B, for example.

FIG. 12C is a diagram illustrating an example of a register format in the status displaying register 603 according to Embodiment 1. Bits from 1 to 7 and 9 to 63 are reserved bits. The bit 0 is a bit for an Error field indicating whether a command is terminated due to an error. "0" in the Error field means that the command is completed normally. "1" in the Error field means that the command is terminated due to an error. The bit 8 is a bit for a Busy field indicating whether a command is being executed. "0" in the Busy field means that the command is completed. "1" in the Busy field means that the command is being executed.

There might be a case in which the cache coherency cannot be maintained because an error related to data transmission between the nodes occurs in the information processing system 1. When the information processing system 1 according to Embodiment 1 detects an error, the information processing system 1 instructs each CPU 2 in the information processing system 1 to delete the data which causes the error to normalize the directory 33. Therefore, the abnormal state of the cache coherency can be restored in the information processing system 1 to improve the cache coherency.

When the information processing system 1 detects an error and can determine a CPU which acquires the data which causes the error by using the information of the directory 33, the information processing system 1 instructs the determined CPU to discard the acquired data. In addition, when the information processing system 1 detects an error related to a failure of a node 4, the information processing system 1 instructs the CPUs 2 in the nodes 4 other than the node 4 in which the failure occurs to discard the acquired data. Therefore, the load for CPUs 2 which do not acquire the data can be reduced to improve the cache coherency.

Embodiment 2

In Embodiment 2, the information processing system 1 investigates the coherency before performing the processes for normalizing the directory in Embodiment 1 when the information processing system 1 detects an error. The information processing system 1 determines whether acquired data is normal in the coherency investigation. When the information processing system 1 determines that an error mark is not set for the data because the error occurs due to a failure such as a communication route failure, the information processing system 1 writes back the acquired data and restores the abnormal state. Since the system configuration and functional configuration of the information processing system 1 according to Embodiment 2 is similar to the system configuration and functional configuration of the information processing system 1 according to Embodiment 1, the detailed descriptions thereof are omitted here.

Circuit Example

Figure 13:
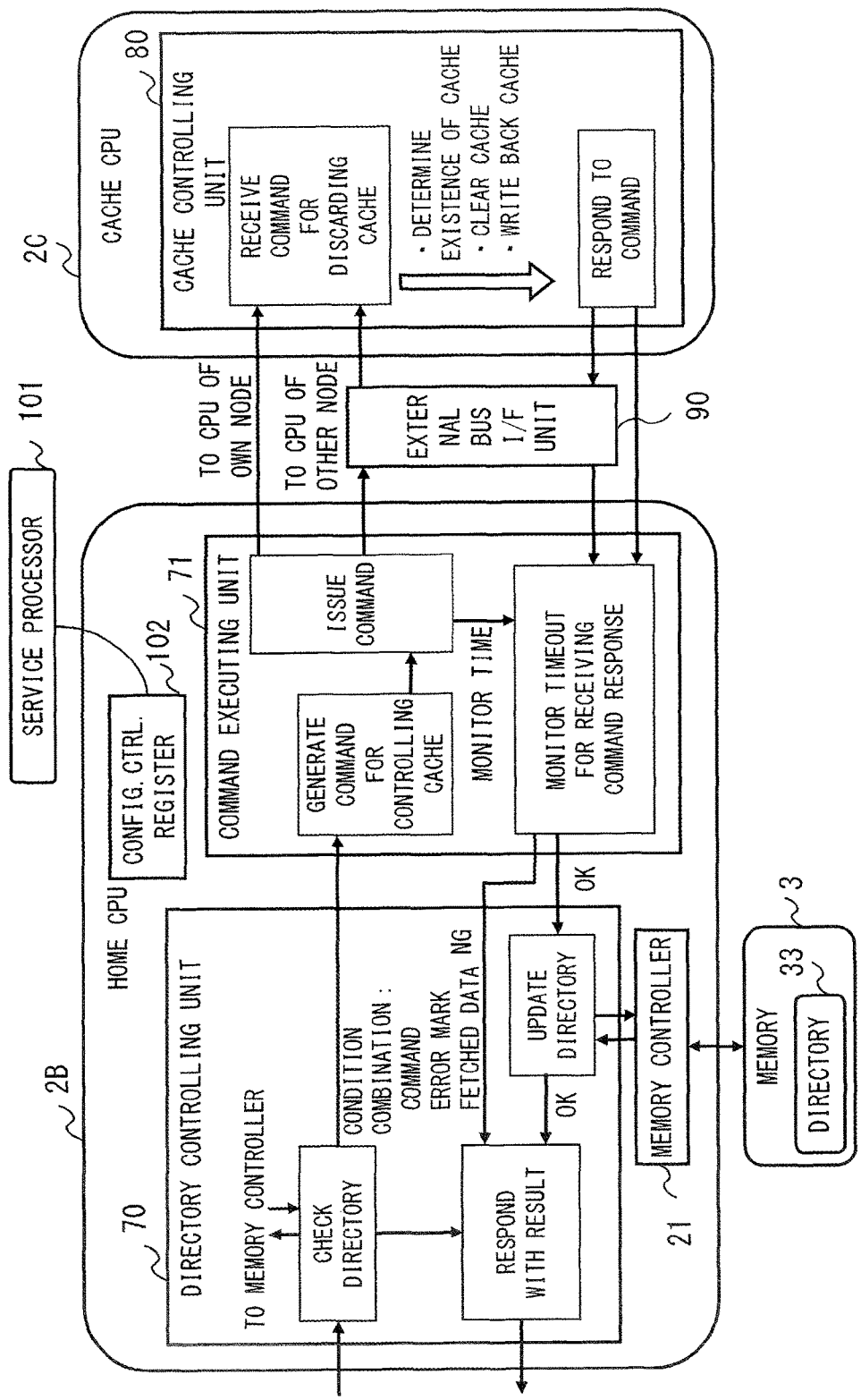
FIG. 13 is a diagram illustrating an example of a circuit of a Home CPU and a circuit of a cache CPU according to Embodiment 2.

FIGS. 13 to 15 are diagrams illustrating circuits of a Home CPU 2B and a cache CPU 2C according to Embodiment 2. Since the circuit of a requester CPU 2A is similar to the circuit of the requester CPU according to Embodiment 1, the detailed descriptions of the requester CPU 2A are omitted here. In addition, since most of the configurations according to Embodiment 2 are similar to the configurations according to Embodiment 1, the descriptions of the common configurations between Embodiment 1 and Embodiment 2 are omitted here and the configuration differences between Embodiment 1 and Embodiment 2 are described below.

FIG. 13 is a diagram illustrating an example of circuits of a Home CPU and a cache CPU according to Embodiment 2. Operations of the directory controlling unit 70 and the command executing unit 71 of the Home CPU 2B and the cache controlling unit 80 of the cache CPU 2C are described below.

The directory controlling unit 70 of the Home CPU 2B accepts requests for the directory normalization or the coherency investigation. When the directory controlling unit 70 accepts a request for directory normalization, the directory controlling unit 70, the command executing unit 71 and the cache controlling unit 80 operates similarly to Embodiment 1.

When the directory controlling unit 70 accepts a request from the requester CPU 2A, the directory controlling unit 70 checks via the memory controller 21 the presence or absence of an error mark in the directory 33 and the presence or absence of acquired data. When the directory controlling unit 70 checks the directory 33, the directory determines based on the content of the command, the presence or absence of the error mark and the presence or absence of the acquired data whether the directory controlling unit 70 issues a command or a response.

When the directory controlling unit 70 accepts a request for coherency investigation and an error mark is not set in the directory 33, the directory controlling unit 70 instructs the command executing unit 71 to generate a command for instructing writing back of the cached data in the determined CPU 2. It is noted that a command for instructing writing back of cached data is referred to as a cache writing back command. When the directory controlling unit 70 references the directory 33 and determines a CPU 2 which acquires data, the directory controlling unit 70 generates a cache writing back command for the determined CPU 2.

When the directory controlling unit 70 accepts a request for coherency investigation and an error mark is set in the directory 33, the directory controlling unit 70 issues a response indicating an error to the requester CPU 2A.

When an error mark is not set in the directory 33, the command executing unit 71 of the Home CPU 2B issues a cache writing back command generated by the directory controlling unit 70 to the CPU 2 which acquires the data. When an error mark is set in the directory 33, the command executing unit 71 operates similarly to Embodiment 1.

When the cache controlling unit 80 of the cache CPU 2C receives a cache writing back command, the cache controlling unit 80 transmits the cached data to the command executing unit 71. When an error occurs, the cache controlling unit 80 transmits a response indicating an error to the command executing unit 80.

When the directory controlling unit 70 receives a response indicating an error from the command executing unit 71 and an error mark is not set in the directory 33, the directory controlling unit 70 sets an error mark in the directory 33.

In the example illustrating in FIG. 13, when an error mark in not set in the directory 33, a command for writing back cached data is issued to a CPU 2 which acquires the data. It is noted that the writing back process is a process for maintaining the coherency between the number of CPUs 2 which acquire data managed by the directory 33 and the actual number of CPUs 2 which acquire data. When data is not written back, the Home CPU 2B can maintain the coherency by counting the actual number of CPUs 2 which acquire data. Since cached data is written back, the management of the CPUs 2 which acquire the data in the coherency investigation can be simplified.

FIG. 14 is a diagram illustrating an example of conditions for determining the operation of the directory controlling unit 70 according to Embodiment 2. The directory controlling unit 70 determines whether to issue a command or to transmit a response indicating a result based on the combination of the content of the command, the presence or absence of an error mark and the presence or absence of acquired data.

The directory controlling unit 70 issues a command to the command executing unit 71, when one of the conditions including a condition "a command is a command for directory normalization and an error mark exists" and a condition "a command is a command for coherency investigation, an error mark does not exist and acquired data exists" is satisfied. The directory controlling unit 70 transmits a response indicating a result to the requester CPU 2A, when one of the conditions including a condition "a command is a command for directory normalization and an error mark does not exist", a condition "a command is a command for coherency investigation, an error mark does not exist and acquired data does not exist" and a condition "a command is a command for coherency investigation, an error mark exists" is satisfied.

Since the register formats of the address specifying register 601 and the command specifying register 602 are similarly to Embodiment 1, the detailed descriptions of the register formats are omitted here. It is noted that similarly to Embodiment 1, "0000" in the Command field of the command specifying register 602 means NOP and "0001" in the Command field thereof means a command for instructing directory normalization. In addition, "0010" in the Command field thereof means a command for instructing discarding of cached data when a failure occurs in the Home CPU 2B. Further, "0011" means a command for instructing coherency investigation.

FIG. 15 is a diagram illustrating an example of a register format of the status displaying register 603 according to Embodiment 2. Bits 2 to 7 and bits 9 to 63 are registered bits. Bits 0 and 1 are provided for an Error filed indicating the status of the result of a command execution. "00" means that a command is completed normally. "01" means that a coherency error is detected and an error mark is set in the directory 33. "10" means that the Home CPU 2B detects an error and discarding of cached data is failed. "11" means that a response is not transmitted from the Home CPU 2B. Similarly to Embodiment 1, bit 8 is provided for a Busy field indicating whether a command is being executed. "0" means that the execution of the command is completed. "1" means that the command is being executed.

<Operation Flow 1>

Figure 16:
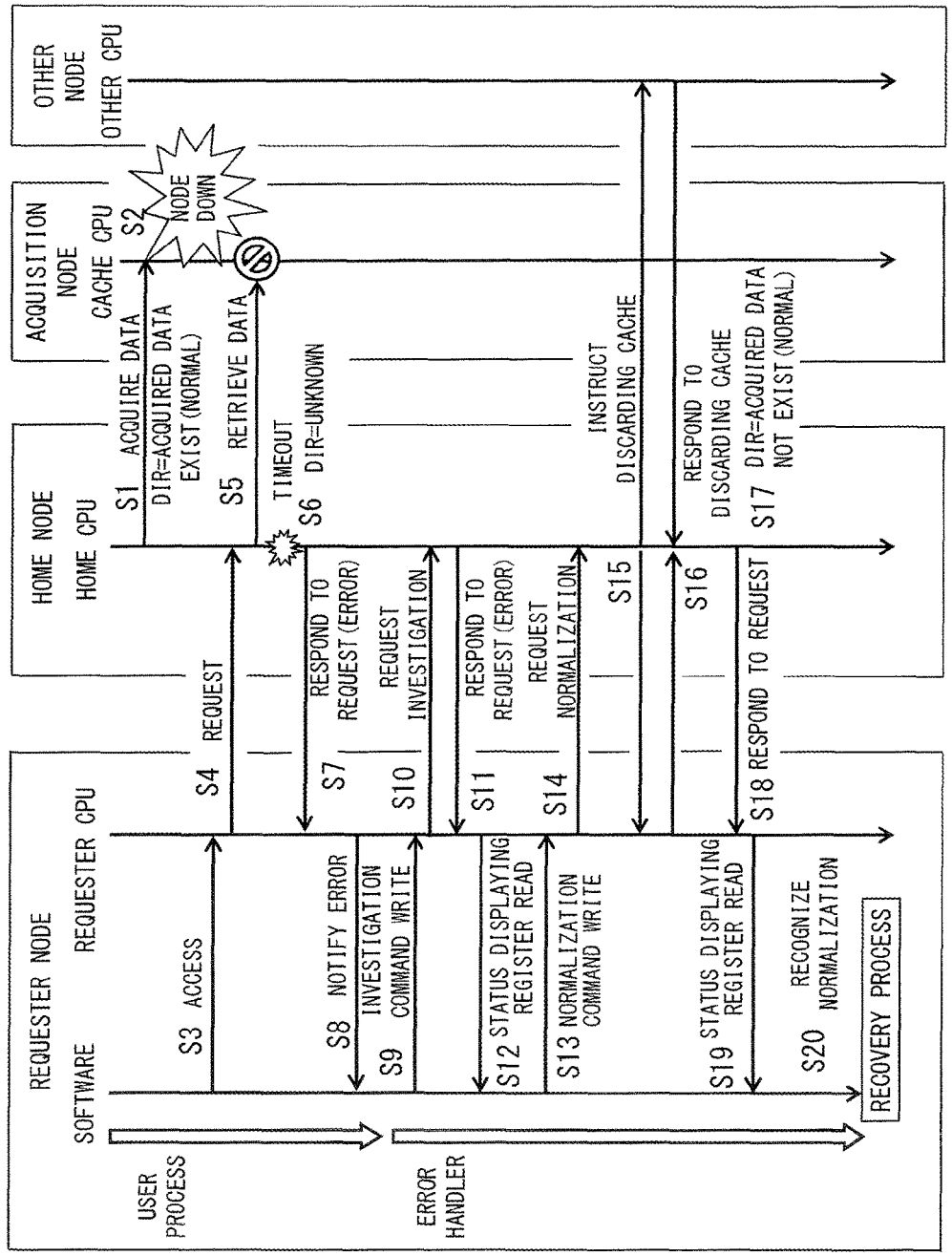
FIG. 16 is a diagram illustrating an example of an operation flowchart in a case in which a failure occurs in a node including a CPU by which data is acquired.

FIG. 16 is a diagram illustrating an example of an operation flow in a case in which a failure occurs in a node including a CPU 2 which acquires data. FIG. 16 illustrates an operation flow for a requester node, a Home node, a acquisition node and the other nodes.

The requester node is a node 4 which issue a request for coherency investigation or directory normalization to the Home node when an error is detected by the software and the requester node includes a requester CPU 2A. The Home node is a node 4 which manages memory for storing acquired data and the Home node includes a Home CPU 2B. The acquisition node is a node which acquires data from the Home node and the acquisition node includes a cache CPU 2C. The other nodes are nodes 4 other than the requester node, the Home node and the acquisition node in the information processing system 1.

Operations S1 to S8 among operations S1 to S20 are operations during the execution of a user process. Operations S9 to S20 among operations S1 to S20 are operations during the execution of an error handler. In addition, operations S9 to S12 among operations S9 to S20 are operations regarding a command for coherency investigation. Further, operations S13 to S20 among operations S9 to S20 are operations regarding a command for directory normalization.

In S1, the cache CPU 2C acquires data from the shared memory 31 of the Home CPU 2B. The Home CPU 2B sets the directory 33 regarding the acquired data to indicate that acquired data exist and an error mark does not exist. In FIG. 16, the directory 33 is indicated by "DIR" (the same applies hereinafter).

In S2, a failure occurs in the acquisition node. Therefore, the directory 33 is in a coherency abnormal state. In S3, the software requests the requester CPU 2A to access the data which the acquisition node acquires from the Home CPU 2B.

In S4, the requester CPU 2A issues a request for access to the acquired data to the Home CPU 2B. In S5, the Home CPU 2B requests the cache CPU 2C to retrieve the acquired data. Since the failure occurs in the acquisition node including the cache CPU 2C, a timeout occurs in the Home CPU 2B.

In S6, the Home CPU 2B set an error mark "Unknown" in the directory 33. In S7, the Home CPU 2B transmits a response indicating an error to the requester CPU 2A. In S8, the requester CPU 2A interrupts the software to notify the software the occurrence of the error and the address of the cache line at which the error occurs.

In S9, the software writes a coherency investigation command in the command specifying register 602 of the requester CPU 2A. In addition, the software writes the address of the cache line at which the error occurs in the address specifying register 601 of the requester CPU 2A as a target address of the cache line for the investigation. In S10, the requester CPU 2A issues a request for investigation of the acquired data to the Home CPU 2B. At this time, an error mark is set in the directory 33.

In S11, the Home CPU 2B transmits a response indicating an error to the requester CPU 2A. The requester CPU 2A sets the result of the execution of the coherency investigation command in the status display register 603. Specifically, the requester CPU 2A sets a value according to the execution result in the Error field of the register format as illustrated in FIG. 15.

In S12, the software reads the status display register 603. In S13, the software writes a directory normalization command in the command specifying register of the requester CPU 2A when the status display register 603 indicates a value other than a value indicating normal. In addition, the software writes the address of the cache line at which the error occurs in the address specifying register 601 of the requester CPU 2A as a target address of the cache line for the directory normalization. It is noted that the software can omit writing of the address in the address specifying register 601 when the address specifying register 601 is not changed during the operations from S10 to S13.

In S14, the requester CPU 2A issues a request for directory normalization to the Home CPU 2B. In S15, the Home CPU 2B instructs the CPUs 2 including the requester CPU 2A which is likely to have acquired the data to discard the data acquired into the cache.

In S16, each CPU 2 which is instructed to discard the cached data transmits a response indicating that the cached data is discarded to the Home CPU 2B. In S17, the Home CPU 2B sets the directory to indicate that acquired data does not exist and an error mark does not exist.

In S18, the Home CPU 2B transmits a response of the result of the cache discarding to the requester CPU 2A. The requester CPU 2A sets the execution result of the directory normalization command in the status display register 603.

In S19, the software reads the status display register 603. In S20, the software recognizes the completion of the directory normalization when the status display register indicates a normal value and initiates a recovery process. It is noted that the recovery process is a process including rollback executed when a user process of the software is interrupted due to an error.

<Operation Flow 2>

Figure 17:
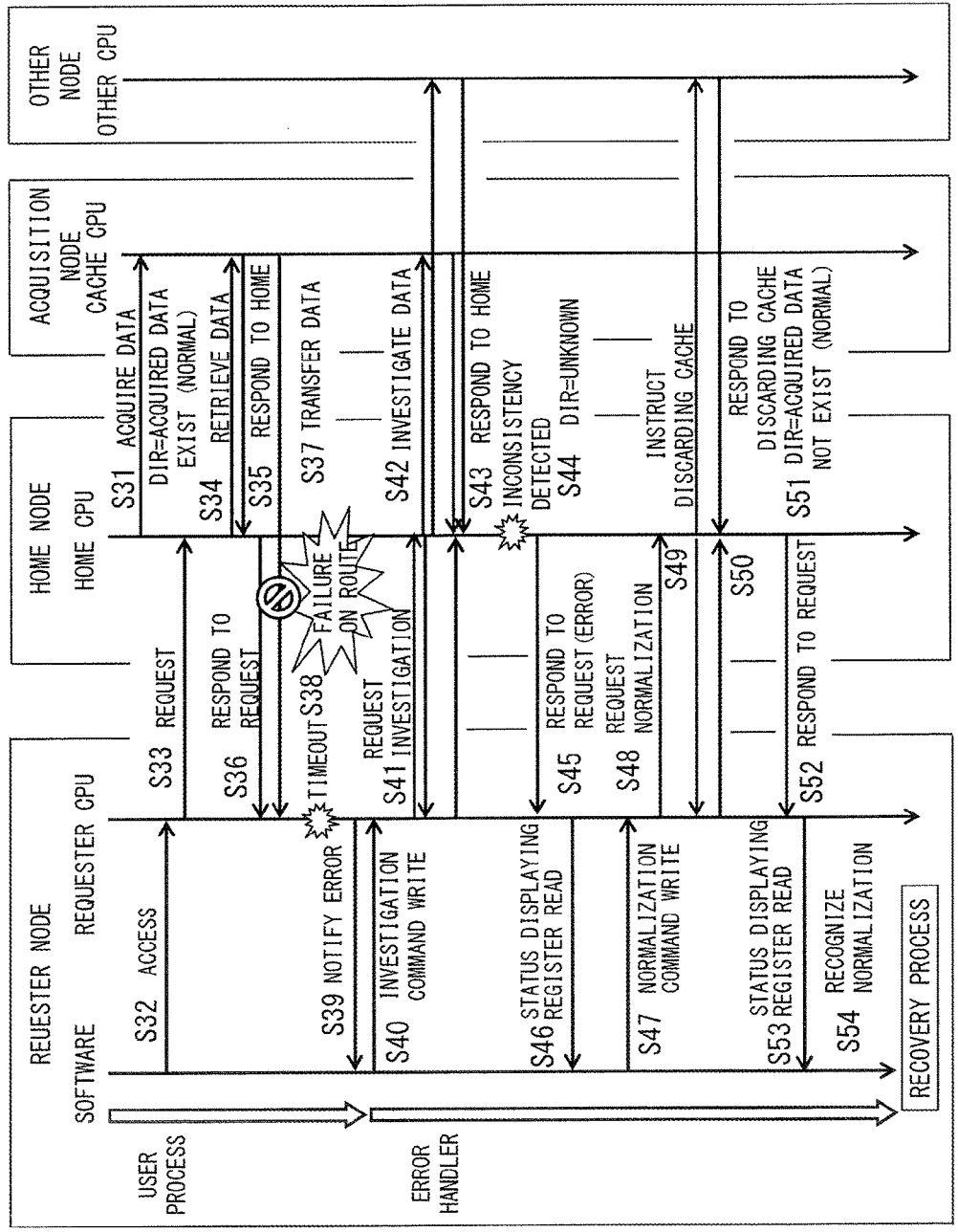
FIG. 17 is a diagram illustrating an example of an operation flowchart in a case in which a failure occurs on a route.

FIG. 17 is a diagram illustrating an example of an operation flow in case of a failure on a communication route. Similarly to FIG. 16, FIG. 17 illustrates an operation flow for a requester node, a Home node, a acquisition node and the other nodes. Since each node is similar to the corresponding node in FIG. 16, the detailed descriptions of each node are omitted here.

Operations S31 to S39 among operations S31 to S54 are operations during the execution of a user process. Operations S40 to S54 among operations S31 to S54 are operations during the execution of an error handler. In addition, operations S40 to S46 among operations S40 to S54 are operations regarding a command for coherency investigation. Further, operations S47 to S54 among operations S40 to S54 are operations regarding a command for directory normalization.

In S31, the cache CPU 2C acquires data from the shared memory 31 of the Home CPU 2B. The Home CPU 2B sets the directory 33 regarding the acquired data to indicate that acquired data exist and an error mark does not exist.

In S32, the software requests the requester CPU 2A to access the data which the acquisition node acquires from the Home CPU 2B. In S33, the requester CPU 2A issues a request for access to the acquired data to the Home CPU 2B.

In S34, the Home CPU 2B requests the cache CPU 2C to retrieve the acquired data. In S35 the cache CPU 2A transmits the acquired data to the Home CPU 2B.

In S36, the Home CPU 2B transmits a response indicating normal to the requester CPU 2A. In S37, the cache CPU 2C transfers the acquired data to the requester CPU 2A. In S38, a failure occurs on the communication route between the cache CPU 2C and the requester CPU 2A. Therefore, the requester CPU 2A detects a timeout. In S39, the requester CPU 2A interrupts the software to notify the software the occurrence of the error and the address of the cache line at which the error occurs.

In S40, the software writes a coherency investigation command in the command specifying register 602 of the requester CPU 2A. In addition, the software writes the address of the cache line at which the error occurs in the address specifying register 601 of the requester CPU 2A as a target address of the cache line for the investigation. In S41, the requester CPU 2A issues a request for investigation of the acquired data to the Home CPU 2B.

In S42, the Home CPU 2B instructs the CPUs 2 including the requester CPU 2A and the cache CPU 2C which is likely to have acquired the data to perform the investigation of the acquired data.

In S43, each CPU 2 which is instructed to perform the investigation transmits a response indicating the result of the investigation to the Home CPU 2B. The CPU 2 which acquires the data writes the acquired data back to the Home CPU 2B.

The Home CPU 2B does not set an error mark in the directory 33 when the data is written back and the process is completed normally. In this case, the Home CPU 2B transmits a response indicating normal to the requester CPU 2A. The requester CPU 2A sets a value indicating that the process is completed normally in the status display register 603. The software reads the status display register 603 and recognizes that an error regarding the coherency does not exist. In this case, a command for directory normalization is not executed.

On the other hand, when a coherency error is detected in S43, a command for directory normalization is executed as described below. In S44, the Home CPU 2B sets an error mark "Unknown" in the directory 33.

In S45, the Home CPU 2B transmits a response indicating an error to the requester CPU 2A. The requester CPU 2A sets a value according to the error in the status display register 603. In S46, the software reads the status display register 603. In S47, the software writes a directory normalization command in the command specifying register 602 of the requester CPU 2A. In addition, the software writes the address of the cache line at which the error occurs in the address specifying register 601 of the requester CPU 2A as a target address of the cache line for the directory normalization. It is noted that the software can omit writing of the address in the address specifying register 601 when the address specifying register 601 is not changed during the operations from S41 to S47.

In S48, the requester CPU 2A issues a request for directory normalization to the Home CPU 2B. In S49, the Home CPU 2B instructs the CPUs 2 including the requester CPU 2A which is likely to have acquired the data to discard the data acquired into the cache.

In S50, each CPU 2 which is instructed to discard the cached data transmits a response indicating that the cached data is discarded to the Home CPU 2B. In S51, the Home CPU 2B sets the directory to indicate that acquired data does not exist and an error mark does not exist.

In S52, the Home CPU 2B transmits a response of the result of the cache discarding to the requester CPU 2A. The requester CPU 2A sets the execution result of the directory normalization command in the status display register 603.

In S53, the software reads the status display register 603. In S54, the software recognizes the completion of the directory normalization when the status display register indicates a normal value and initiates a recovery process.

<Operation Flow 3>

Figure 18:
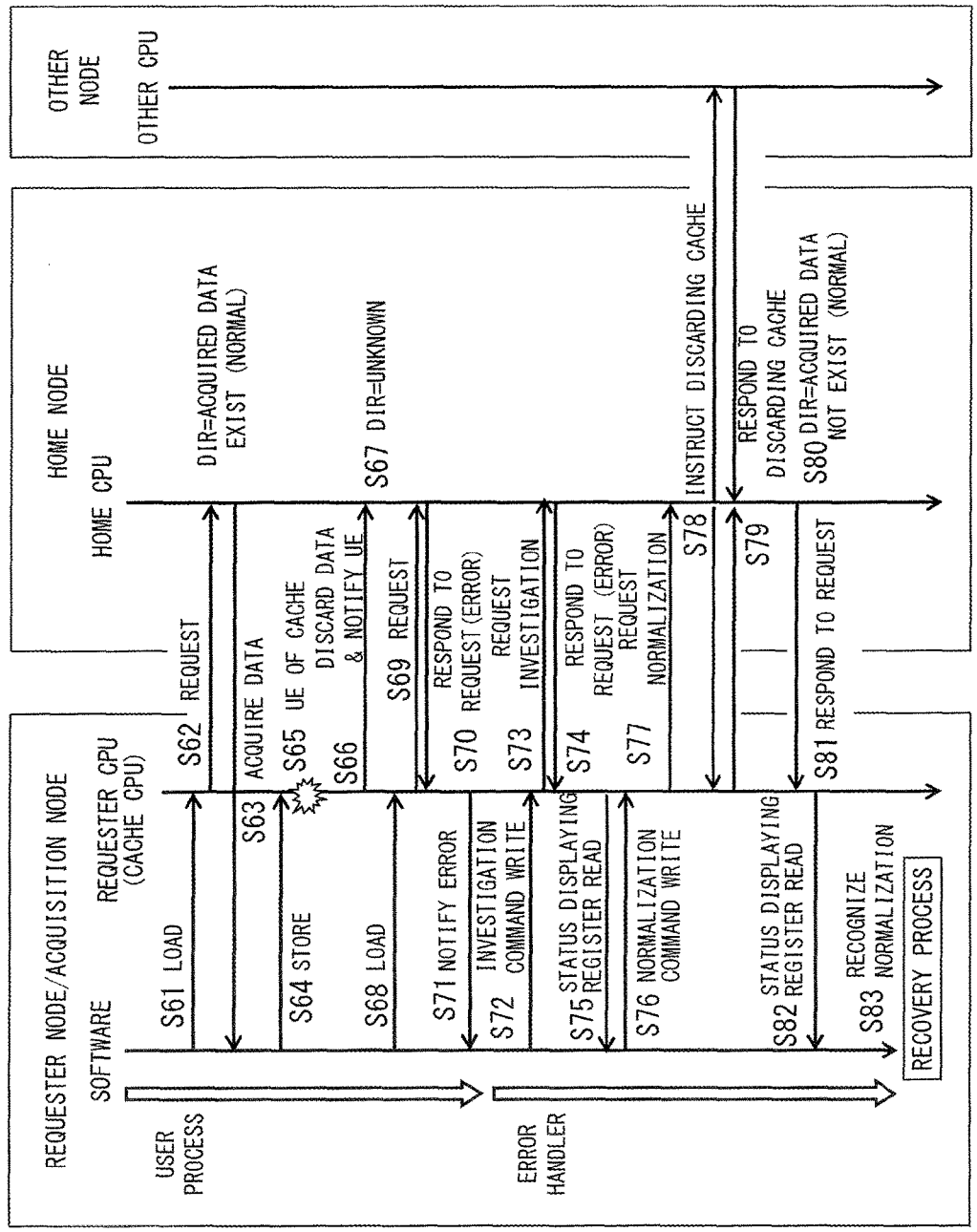
FIG. 18 is a diagram illustrating an example of an operation flowchart in a case in which an error occurs and cache error correction cannot be achieved.

FIG. 18 is a diagram illustrating an example of an operation flow in case of an error in which a cache error correction cannot be achieved. FIG. 18 illustrates an operation flow for a requester node, a Home node and the other nodes. In FIG. 18, the requester node also operates as a acquisition node. Since each node is similar to the corresponding node in FIG. 16, the detailed descriptions of each node are omitted here.

Operations S61 to S71 among operations S61 to S83 are operations during the execution of a user process. Operations S72 to S83 among operations S61 to S83 are operations during the execution of an error handler. In addition, operations S72 to S75 among operations S72 to S83 are operations regarding a command for coherency investigation. Further, operations S76 to S83 among operations S72 to S83 are operations regarding a command for directory normalization.

In S61, the software requests the requester CPU 2A to load the data to be accessed. In S62, the requester CPU 2A issues a request for access to the data to the Home CPU 2B.

In S63, the requester CPU 2A acquires the data from the shared memory 31 of the Home CPU 2B. The Home CPU 2B sets the directory 33 from the data is acquired to indicate that acquired data does not exist and an error mark does not exist.

In S64, the software requests the requester CPU 2A to store the acquired data. In S65, the requester CPU 2A detects an Uncorrectable Error (UE) of the cache.

In S66, the requester CPU 2A notifies the Home CPU 2B of the occurrence of the UE and instructs the Home CPU 2B to discard the cached data. In S67, the Home CPU 2B sets an error mark "Unknown" in the directory 33.

In S68, the software requests the requester CPU 2A to load the data accessed in S61. In S69, the requester CPU 2A issues a request for access to the data to the Home CPU 2B. At this time, an error mark is set in the directory 33.

In S70, the Home CPU 2B transmits a response indicating an error to the requester CPU 2A. In S71, the requester CPU 2A interrupts the software to notify the software the occurrence of the error and the address of the cache line at which the error occurs.

In S72, the software writes a coherency investigation command in the command specifying register 602 of the requester CPU 2A. In addition, the software writes the address of the cache line at which the error occurs in the address specifying register 601 of the requester CPU 2A as a target address of the cache line for the investigation. In S73, the requester CPU 2A issues a request for an investigation of the acquired data to the Home CPU 2B. At this time, an error mark is set in the directory 33.

In S74, the Home CPU 2B transmits a response indicating an error to the requester CPU 2A. The requester CPU 2A sets the execution result of the coherency investigation command in the status display register 603.

In S75, the software reads the status display register 603. In S76, the software writes a directory normalization command in the command specifying register 602 of the requester CPU 2A when the status display register 603 indicates a value other than a value indicating normal. In addition, the software writes the address of the cache line at which the error occurs in the address specifying register 601 of the requester CPU 2A as a target address of the cache line for the directory normalization. It is noted that the software can omit writing of the address in the address specifying register 601 when the address specifying register 601 is not changed during the operations from S73 to S76.

In S77, the requester CPU 2A issues a request for directory normalization to the Home CPU 2B. In S78, the Home CPU 2B instructs the CPUs 2 including the requester CPU 2A which is likely to have acquired the data to discard the data acquired into the cache.

In S79, each CPU 2 which is instructed to discard the cached data transmits a response indicating that the cached data is discarded to the Home CPU 2B. In S80, the Home CPU 2B sets the directory to indicate that acquired data does not exist and an error mark does not exist.

In S81, the Home CPU 2B transmits a response of the result of the cache discarding to the requester CPU 2A. The requester CPU 2A sets the execution result of the directory normalization command in the status display register 603.

In S82, the software reads the status display register 603. In S83, the software recognizes the completion of the directory normalization when the status display register indicates a normal value and initiates a recovery process.

In Embodiment 2, the information processing system 1 investigates the coherency before the directory normalization according to Embodiment 1 is performed when an error is detected. When a coherency error is not detected in the coherency investigation, the process for directory normalization is not performed. Therefore, the information processing system 1 can restore the coherency error state according to a failure such as a failure on a communication route and a failure of a node to improve the cache coherency.

When the state of the data as the target of the coherency investigation is normal, the acquired data is written back to the Home CPU 2B. Therefore, since the number of CPUs 2 which acquire the data managed by the directory 33 is initialized, the management of the CPUs 2 which acquire the data can be simplified to improve the cache coherency.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory). In addition, a Solid State Drive (SSD) can be used either as a recording medium which is detachable from the computer or as a recording medium which is fixed to the computer.

According to one aspect, a technique for restoring an error state regarding cache coherency in a shared memory system can be achieved.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing system for maintaining cache coherency in which a plurality of nodes including one or more processing units each of which manages memory and cache connected with its own processing unit are connected with each other, wherein each processing unit executes:
    instructing a measure regarding a detected error;
    updating state management information managed for each predetermined unit of data in the memory;
    issuing a command to a processing unit other than its own processing unit according to the state management information of its own processing unit; and
    executing a command issued by a processing unit other than its own processing unit,
    wherein a first processing unit instructs a second processing unit to update the state management information regarding first data managed by the second processing unit when the first processing unit accesses the first data and detects an error regarding the first data,
    wherein the second processing unit issues a command for discarding a first data acquired by a third processing unit to the third processing unit,
    wherein when the third processing unit which acquires the first data receives the command, the third processing unit which acquires the first data discards the first data and transmits a result of the discarding of the first data to the second processing unit,
    wherein the second processing unit updates the state management information regarding the first data based on the result received from the third processing unit,
    wherein when the first processing unit detects the error regarding the first data, the first processing unit instructs the second processing unit to update the state management information to indicate that the first data is abnormal and the second processing unit updates the state management information to indicate that the first data is normal based on the result of the discarding of the first data, and
    wherein the updating of the state management information and the discarding of the first data are executed during an address lock to improve coherency of the first data.

2. The information processing system according to claim 1, wherein when the second processing unit determines the processing unit which acquires the first data based on the state management information, the second processing unit issues a command for discarding the first data to the determined processing unit.

3. The information processing system according to claim 1, wherein when the second processing unit detects an error due to a failure of a node, the second processing unit issues a command for discarding the first data to a processing unit of a node other than the node in which the failure occurs.

4. The information processing system according to claim 1, wherein when the result of the discarding of the first data indicates that the first data is discarded normally, the second processing unit updates the state management information to indicate that the state of the first data is normal.

5. The information processing system according to claim 1, wherein
    the first processing unit instructs the second processing unit to determine whether the state of the first data is normal before the first processing unit instructs the second processing unit to update the state management information regarding the first data,
    the second processing unit accepts an instruction from the first processing unit to determine whether the state of the first data is normal based on the state management information, and
    the first processing unit instructs the second processing unit to update the state management information regarding the first data when the second processing unit determines that the state of the first data is not normal.

6. The information processing system according to claim 5, wherein
    the second processing unit issues a command for writing back the first data to the processing unit which acquires the first data when the second processing unit determines that the state of the first data is normal, and
    the processing unit which receives the command for writing back the first data transmits the first data to the second processing unit.

7. An information processing method of maintaining cache coherency, comprising:
    instructing, by a computer, when a first processing unit in an information processing system in which a plurality of nodes including one or more processing units each of which manages memory and cache connected with its own processing unit are connected with each other accesses first data which is predetermined unit of data managed by a second processing unit and detects an error regarding the first data, the second processing unit in the information processing system to update state management information regarding the first data managed by the second processing unit;
    issuing, by the computer, a command for discarding a first data acquired by a third processing unit to the third processing unit;
    discarding, by the computer, the first data upon receiving the command for discarding the first data;
    transmitting, by the computer, a result of the discarding of the first data to the second processing unit; and
    updating, by the computer, the state management information regarding the first data based on the result,
    wherein when the first processing unit detects the error regarding the first data, the first processing unit instructs the second processing unit to update the state management information to indicate that the first data is abnormal and the second processing unit updates the state management information to indicate that the first data is normal based on the result of the discarding of the first data, and wherein the updating of the state management information and the discarding of the first data are executed during an address lock to improve coherency of the first data.

8. A non-transitory computer-readable recording medium storing a program that causes a computer in an information processing system to execute a process, the process comprising:

instructing when a first processing unit in an information processing system in which a plurality of nodes including one or more processing units each of which manages memory and cache connected with its own processing unit are connected with each other accesses first data which is predetermined unit of data managed by a second processing unit and detects an error regarding the first data, the second processing unit in the information processing system to update state management information regarding the first data managed by the second processing unit;

issuing a command for discarding a first data acquired by a third processing unit to the third processing unit;

discarding the first data upon receiving the command for discarding the first data;

transmitting a result of the discarding of the first data to the second processing unit; and updating the state management information regarding the first data based on the result, wherein when the first processing unit detects the error regarding the first data, the first processing unit instructs the second processing unit to update the state management information to indicate that the first data is abnormal and the second processing unit updates the state management information to indicate that the first data is normal based on the result of the discarding of the first data, and wherein the updating of the state management information and the discarding of the first data are executed during an address lock to improve coherency of the first data.

9. An information processing apparatus for maintaining cache coherency including a plurality of nodes including one or more processing units each of which manages memory and cache connected with its own processing unit are connected with each other, wherein each processing unit executes:

instructing a measure regarding a detected error;

updating state management information managed for each predetermined unit of data in the memory;

issuing a command to a processing unit other than its own processing unit according to the state management information of its own processing unit; and executing a command issued by a processing unit other than its own processing unit, wherein a first processing unit instructs a second processing unit to update the state management information regarding first data managed by the second processing unit when the first processing unit accesses the first data and detects an error regarding the first data, wherein the second processing unit issues a command for discarding a first data acquired by a third processing unit to the third processing unit, wherein when the third processing unit which acquires the first data receives the command, the third processing unit which acquires the first data discards the first data and transmits a result of the discarding of the first data to the second processing unit, the second processing unit updates the state management information regarding the first data based on the result received from the third processing unit, wherein when the first processing unit detects the error regarding the first data, the first processing unit instructs the second processing unit to update the state management information to indicate that the first data is abnormal and the second processing unit updates the state management information to indicate that the first data is normal based on the result of the discarding of the first data, and wherein the updating of the state management information and the discarding of the first data are executed during an address lock to improve coherency of the first data.

10. An information processing system for maintaining cache coherency including a plurality of processing units each of which manages memory and cache connected with its own processing unit are connected with each other, wherein each processing unit executes:

instructing a measure regarding a detected error;

updating state management information managed for each predetermined unit of data in the memory;

issuing a command to a processing unit other than its own processing unit according to the state management information of its own processing unit; and executing a command issued by a processing unit other than its own processing unit, wherein a first processing unit instructs a second processing unit to update the state management information regarding first data managed by the second processing unit when the first processing unit accesses the first data and detects an error regarding the first data, wherein the second processing unit issues a command for discarding a first data acquired by a third processing unit to the third processing unit, wherein when the third processing unit which acquires the first data receives the command, the third processing unit which acquires the first data discards the first data and transmits a result of the discarding of the first data to the second processing unit, wherein the second processing unit updates the state management information regarding the first data based on the result received from the third processing unit, wherein when the first processing unit detects the error regarding the first data, the first processing unit instructs the second processing unit to update the state management information to indicate that the first data is abnormal and the second processing unit updates the state management information to indicate that the first data is normal based on the result of the discarding of the first data, and wherein the updating of the state management information and the discarding of the first data are executed during an address lock to improve coherency of the first data.

* * * * *